US009486774B2

(12) United States Patent
Verma et al.

(10) Patent No.: US 9,486,774 B2
(45) Date of Patent: Nov. 8, 2016

(54) SYSTEM AND PROCESS FOR THERMOCHEMICAL TREATMENT OF MATTER CONTAINING ORGANIC COMPOUNDS

(75) Inventors: Mausam Verma, Québec (CA); Stéphane Godbout, Québec (CA); Olga Solomatnikova, Québec (CA); Dan Zegan, Québec (CA); Jean-Pierre Larouche, Québec (CA); Frédéric Pelletier, Québec (CA)

(73) Assignees: Institut de recherche et de developpement en agroenvironnement Inc. (IRDA), Quebec (CA); Centre de recherche industrielle du Quebec (CRIQ), Quebec (CA)

( * ) Notice: Subject to any disclaimer, the term of this patent is extended or adjusted under 35 U.S.C. 154(b) by 322 days.

(21) Appl. No.: 14/006,773

(22) PCT Filed: Mar. 23, 2012

(86) PCT No.: PCT/CA2012/000260
§ 371 (c)(1),
(2), (4) Date: Sep. 23, 2013

(87) PCT Pub. No.: WO2012/126096
PCT Pub. Date: Sep. 27, 2012

(65) Prior Publication Data
US 2014/0013657 A1 Jan. 16, 2014

Related U.S. Application Data

(60) Provisional application No. 61/466,746, filed on Mar. 23, 2011.

(51) Int. Cl.
C10B 1/04 (2006.01)
C10B 47/44 (2006.01)
(Continued)

(52) U.S. Cl.
CPC ............... B01J 19/24 (2013.01); C10B 47/44 (2013.01); C10B 53/02 (2013.01); C10C 5/00 (2013.01);
(Continued)

(58) Field of Classification Search
CPC ......... C10B 1/04; C10B 47/44; C10B 53/02; B01J 8/10; B01J 8/12; B01J 19/2024; C10G 1/02; C10C 5/00; C10J 3/007; C10L 1/02; C10L 1/1802; C10L 5/42; C10L 5/447; C10L 9/083
USPC ................. 202/118, 120, 124; 201/4, 32, 34
See application file for complete search history.

(56) References Cited

U.S. PATENT DOCUMENTS 1,276,866 A * 8/1918 Boyle ....................... C10B 1/04
202/108
1,415,061 A * 5/1922 Smith ....................... C10B 7/02
202/118

(Continued)

FOREIGN PATENT DOCUMENTS

CA 2502638 9/2005
CN 101899315 A 12/2010

OTHER PUBLICATIONS

Machine translation of CN 101899315 (Dec. 2010).*
(Continued)

Primary Examiner — Jill Warden
Assistant Examiner — Joye L Woodard
(74) Attorney, Agent, or Firm — Benoit & Cote Inc.

(57) ABSTRACT

The present document describes a system and a process for the thermochemical treatment a matter containing organic compounds such as biomass, for the production of useful energetic products such as biochar, bio-oil and gases from non-condensed vapors. The system comprises a reactor comprising a feedstock reservoir having entry and exit, a thermochemical reaction chamber having an entrance disposed under and coupled to the reservoir exit, an exit, and a first heating means for thermal treatment of the matter to produce a solid and a vapor. The system also comprises a feeder having at least one substantially vertical auger operatively coupled to the feedstock reservoir and the thermochemical reaction chamber exit to drive the matter downwardly from the feedstock reservoir exit through the thermochemical reaction chamber. A chamber for separation of the solid from the vapor which maintains the vapor in a gaseous state has an entrance coupled to the thermochemical reaction chamber exit, and an exit for exit of said vapor. The system also comprises a controller, operatively coupled to the first heating means for controlling temperature of the thermochemical reaction chamber, and a pump operatively coupled to the separation chamber exit for maintaining a light vacuum within the reactor and for helping exit of the vapor.

21 Claims, 14 Drawing Sheets

(51) Int. Cl.
| | |
|---|---|
| B01J 19/24 | (2006.01) |
| C10B 53/02 | (2006.01) |
| C10C 5/00 | (2006.01) |
| C10J 3/00 | (2006.01) |
| C10L 9/08 | (2006.01) |
| C10L 1/02 | (2006.01) |
| C10L 5/42 | (2006.01) |
| C10L 5/44 | (2006.01) |
| C10G 1/02 | (2006.01) |
| C10L 1/18 | (2006.01) |

(52) U.S. Cl.
CPC .............. *C10G 1/02* (2013.01); *C10J 3/007* (2013.01); *C10L 1/02* (2013.01); *C10L 1/1802* (2013.01); *C10L 5/42* (2013.01); *C10L 5/447* (2013.01); *C10L 9/083* (2013.01); *C10G 2300/1018* (2013.01); *C10J 2300/0916* (2013.01); *C10J 2300/0956* (2013.01); *Y02E 50/10* (2013.01); *Y02E 50/14* (2013.01); *Y02E 50/15* (2013.01); *Y02E 50/30* (2013.01); *Y02E 50/32* (2013.01); *Y02P 20/145* (2015.11); *Y02P 30/20* (2015.11)

(56) References Cited

U.S. PATENT DOCUMENTS

| | | | | |
|---|---|---|---|---|
| 1,723,932 | A | * | 8/1929 | Greene .................. C10B 7/10 202/118 |
| 2,160,341 | A | | 5/1939 | Reichert |
| 2,642,387 | A | | 6/1953 | Steinschlaeger |
| 2,791,549 | A | * | 5/1957 | Jahnig .................... C10G 9/32 196/120 |
| 2,924,556 | A | | 2/1960 | Jaeppelt et al. |
| 2,983,653 | A | | 5/1961 | Danulat et al. |
| 3,616,266 | A | | 10/1971 | Hall et al. |
| 3,658,654 | A | | 4/1972 | Gutberlet |
| 4,084,521 | A | | 4/1978 | Herbold et al. |
| 4,206,713 | A | | 6/1980 | Ryason |
| 4,210,491 | A | | 7/1980 | Schulman |
| 4,235,676 | A | * | 11/1980 | Chambers ................ C07C 1/00 201/35 |
| 4,255,129 | A | * | 3/1981 | Reed ........................ C10B 7/04 202/118 |
| 4,261,795 | A | | 4/1981 | Reilly |
| 4,287,025 | A | | 9/1981 | Lersmacher |
| 4,344,770 | A | | 8/1982 | Capener et al. |
| 4,347,119 | A | | 8/1982 | Thomas |
| 4,439,209 | A | | 3/1984 | Wilwerding et al. |
| 4,867,848 | A | | 9/1989 | Cordier et al. |
| 4,891,459 | A | | 1/1990 | Knight et al. |
| 5,636,580 | A | | 6/1997 | Kanis |
| 5,720,232 | A | | 2/1998 | Meador |
| 5,866,754 | A | | 2/1999 | De Blangy et al. |
| 5,993,751 | A | | 11/1999 | Moriarty et al. |
| 6,178,899 | B1 | | 1/2001 | Kaneko et al. |
| 6,202,577 | B1 | | 3/2001 | Boguslavsky et al. |
| 6,221,329 | B1 | | 4/2001 | Faulkner et al. |
| 6,375,345 | B1 | | 4/2002 | Lepez et al. |
| 6,398,921 | B1 | | 6/2002 | Moraski |
| 6,790,317 | B2 | | 9/2004 | Antal, Jr. |
| 6,830,597 | B1 | | 12/2004 | Green |
| 6,840,712 | B2 | | 1/2005 | Satchwell et al. |
| 6,972,085 | B1 | | 12/2005 | Brecher et al. |
| 7,004,999 | B2 | | 2/2006 | Johnson et al. |
| 7,329,329 | B2 | | 2/2008 | Masemore et al. |
| 2008/0286557 | A1 | | 11/2008 | Tucker |
| 2011/0011721 | A1 | | 1/2011 | Champagne |

OTHER PUBLICATIONS

Bridgwater et al., A techno-economic comparison of power production by biomass fast pyrolysis with gasification and combustion, Bio-Energy Research Group, Aston University, Birmingham B4 7ET, UK, 2002 Elsevier Science Ltd.68 pages.
Godbout et al.; Bio-Fuels Production Using Pork Manure Solids Via Vacuum Pyrolysis: Preliminary Study; Institut de recherche et de développement en agroenvironnement inc; (IRDA), 2700 rue Einstein; Québec (Québec), G1P 3W8, Canada; Jun. 23, 2009 ; 8 pages.
Godbout et al.;Développement d'un procédé de transformation à la ferme de la fraction solide issue de la separation des lisiers de porcs en matières énergétiques ;IRDA, Jul. 9, 2009, Canada, 2 pages.
Godbout et al., Transformation des solides de lisier de porc en matières énergetiques, IRDA, Aug. 26, 2010, Canada, 2 pages.
PCT/International Search Report (ISR)—PCT/CA2012/000260 (Form PCT/ISA/220)—Jun. 28, 2012—5 pages.
Verma, Vacuum pyrolysis of swine manure : biochar production and characteristics; CIGR 2010, Jun. 15, 2010 Québec, 16 pages.
English Abstract of CN101899315; Published on Dec. 1, 2010; Retrieved from www.espacenet.com on Mar. 2, 2015.

* cited by examiner

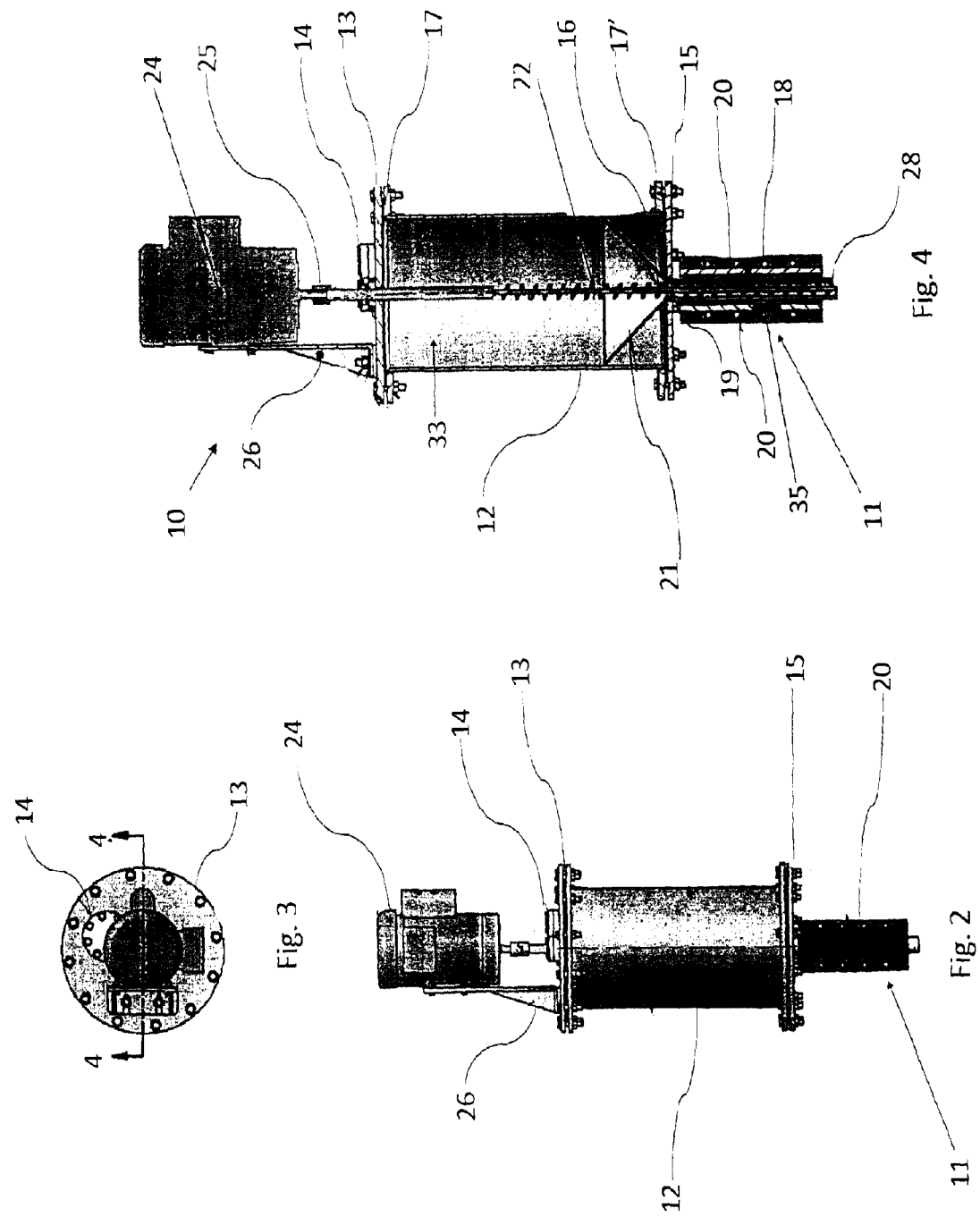

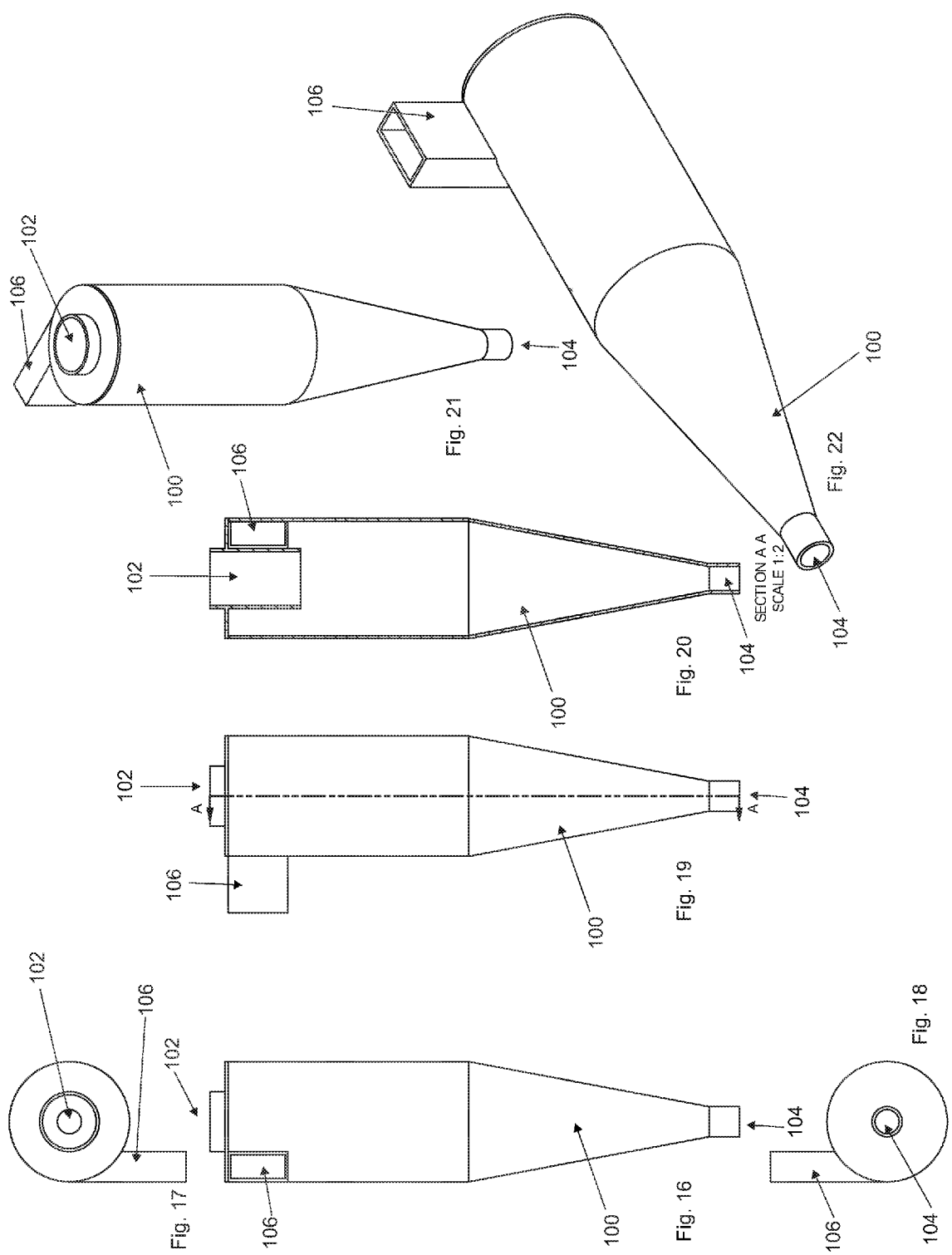

SYSTEM AND PROCESS FOR THERMOCHEMICAL TREATMENT OF MATTER CONTAINING ORGANIC COMPOUNDS

CROSS-REFERENCE TO RELATED APPLICATIONS

This application is a US National Phase application under 35 USC §371 of PCT/CA2012/000260, filed Mar. 23, 2012, which claims priority from and the benefit of U.S. Provisional Application No. 61/466,746, filed Mar. 23, 2011, the specifications of which are hereby incorporated by reference in their entirety.

BACKGROUND (a) Field

The subject matter disclosed generally relates to systems and processes for the treatment of matter containing organic compounds. More specifically, the subject matter relates to a thermochemical treatment system and processes of using the same for the production of energetic products.

(b) Related Prior Art

Matters containing organic compounds, such as agricultural biomass, as an energy resource have several environmental and economical advantages and have potential to substantially contribute to present days fuel and energy demands. The utilization of waste-biomass in this regard would also contribute to minimize hazards of traditional waste management systems. During the last few decades, the inevitable increasing trend of intensive farming (agriculture and animal production) has necessitated development of innovative techniques and management schemes for disposal of waste-biomass. Currently, there are several developing or established processes, such as gasification, fermentation and thermochemical treatment, for conversion of agricultural biomass to energetic products (hydrogen, methane, bioethanol, biomethanol, bio-oil, biochar, biodiesel, and others).

Among all these processes, the thermochemical conversion of matters containing organic compounds such as complex biomass to bio-fuels (bio-oil, biochar, and gas) and synthetic gasoline equivalents (through thermal gasification, chemical synthesis and refining steps) seems promising and feasible. The relative advantage of thermochemical conversion over others is due to higher productivity and compatibility with existing infrastructure facilities. However, the majority of these processes are still under development phase and trying to secure a market share due to various challenges, from suitable infrastructure, raw material availability, technical limitations, government policies and social acceptance. The knowledge at hand suggests that biomass can become a sustainable and major contributor to the current energy and fuel demands, through the thermochemical conversion processes for various agricultural biomass types.

Swine production in Canada, is facing serious environmental and economic challenges. Approximately 20% of swine producers would surpass phosphorus application limits, threatening soil quality and eutrophication of natural water bodies. The solid-liquid separation appeared to be an eco-friendly solution. However, the management of the solid fraction produced by this approach has become a new challenge due to the dry matter content (~30-35%). A solution is to transform this biosolid by a thermochemical conversion (e.g., pyrolysis) which consists of converting swine manure into energetic products such as bio-oil, biochar, and gas. This will significantly enhance the environmental quality around swine production (reduction of greenhouse gases, soil quality and economic benefits).

Accordingly, there is a need for thermochemical treatment systems for the conversion of matters containing organic compounds such as agricultural biomass into useful energetic products.

Also, there is a need for thermochemical treatment processes for the conversion of matters containing organic compounds such as agricultural biomass into useful energetic products.

SUMMARY

According to an embodiment, there is provided a system for thermochemical treatment of matter containing organic compounds, comprising:

a reactor comprising:
    a feedstock reservoir having a reservoir entry, and a reservoir exit, for the matter,
    a thermochemical reaction chamber, having
        a thermochemical reaction chamber entrance disposed under coupled to the reservoir exit,
        a first heating means for thermal treatment of the matter to produce a solid and a vapor, and
        a thermochemical reaction chamber exit,
    a feeder having
        at least one substantially vertical auger operatively coupled to the feedstock reservoir and the thermochemical reaction chamber exit to drive the matter from the feedstock reservoir through the thermochemical reaction chamber,
    a chamber for separation of the solid from the vapor while substantially maintaining the vapor in a gaseous state, having
        a separation chamber entrance coupled to the thermochemical reaction chamber exit, and
        a separation chamber exit for exit of the vapor;
a controller operatively coupled to the first heating means for controlling temperature of the thermochemical reaction chamber
a pump for maintaining a light vacuum within said reactor and for helping exit of said vapor.

The feedstock reservoir may further comprise a funnel, for guiding the matter to the reservoir exit.

The reservoir may comprise a sealed door.

The first heating means may be chosen from an electrical block, a combustion heating means, a heat transfer fluid, a heat transfer gas, a microwave source, an induction block, or combinations thereof.

The combustible of the combustion heat source may be a solid combustible, a liquid combustible, a gaseous combustible, or combinations thereof.

The first heating means may be an electrical block

The at least one auger may be a shaftless screw conveyor.

The separation chamber may comprise a second heating means for heating the separation chamber and maintaining vapor in a gaseous state.

The second heating means may be thermally coupled to the separation chamber.

The separation chamber may comprise a cyclonic separator receiving the solid and the vapor at the separation chamber entrance.

The cyclonic separator may comprise a cyclonic separator entrance forming the separation chamber entrance, a cyclonic separator exit for exit of the solid, and a gas line exit forming the separation chamber exit.

The thermochemical reaction chamber may further comprise a first temperature sensor.

The thermochemical reaction chamber may further comprise a first temperature sensor, and the separation chamber may further comprise a second temperature sensor.

The controller may be electrically coupled to the first temperature sensor for controlling temperature in the thermochemical reaction chamber.

The controller may be electrically coupled to the second temperature sensor for controlling temperature in the separation chamber.

The temperature may be controlled at an operating temperature from about 200° C. to about 250° C.

The reactor may be in a substantially vertical orientation.

The system of the present invention may be further comprising a pump for maintaining a light vacuum within the reactor.

The light vacuum may be at a pressure of about 500 mm Hg.

The system of the present invention may be further comprising a vapor processing unit, coupled to the separation chamber exit.

The system of the present invention may be further comprising a vapor processing unit, coupled to the gas line exit.

The vapor processing unit may comprise at least one condenser, at least one vapor collector and at least one condensed vapor fraction collector.

The vapor processing unit may be coupled to the separation chamber exit with a first conduit.

The first conduit may be heated to prevent condensation of the vapor.

The first conduit may be electrically heated.

The vapor processing unit may comprise a first section having a vapor and bio-oil collector.

The vapor and bio-oil collector may comprise a first reservoir having:
a first reservoir upper portion, for receiving and collecting the vapor, and having a first reservoir exit; and
a first reservoir lower portion, for collecting a bio-oil.

The vapor and bio-oil collector may be maintained at an operating temperature lower than an operating temperature of the separation chamber.

The separation chamber operating temperature may be from about 200° C. to about 250° C.

The vapor processing unit may further comprise a second section having a bio-oil condenser and collector connected to the first section, for condensing the vapor and collecting said bio-oil obtained therefrom.

The vapor processing unit may further comprise a second section having a bio-oil condenser and collector connected to first reservoir exit, for condensing the vapor and collecting said bio-oil obtained therefrom.

The second section may be connected to the first reservoir exit with a second conduit.

The bio-oil condenser and collector may comprise:
a condenser having a cooler, for condensing the vapor; and
a second reservoir, for collecting the bio-oil obtained therefrom.

The second reservoir may further comprise a second reservoir exit for a non-condensed fraction of the vapor.

The vapor processing unit may further comprise a third section having a vapor reservoir connected to the second section, for collecting a non-condensed fraction of the vapor comprising non-condensable gases.

The vapor reservoir may further comprise a vapor reservoir cooler for further condensing the vapor and obtain bio-oil therefrom.

The vapor reservoir may further comprise a vapor reservoir exit.

The system of the present invention may be further comprising a pump, operatively coupled to the vapor reservoir exit.

The vapor processing unit may further comprise an outlet after said third section.

The system may be further comprising a pump, operatively coupled to the gas line exit.

The processing unit may comprise a bio-oil condenser and collector operatively coupled to the pump, and may be comprising:
a condenser having a cooler, for condensing the vapor; and
a reservoir, for collecting said bio-oil obtained therefrom.

The system of the present invention may be further comprising an outlet after the vapor processing unit.

The outlet may be further coupled to the reaction chamber exit, for recycling of the vapor.

The thermochemical reaction chamber may have an inner diameter of about 2.5 cm.

The thermochemical reaction chamber may have a length of about 25 cm.

The feeder may be coupled to a motor providing an adjustable speed.

The adjustable speed may be from about 20 revolutions per minute to about 300 revolutions per minute.

The at least one auger may be two augers.

The auger may have an exterior diameter of about 2.5 cm.

The auger may have a core diameter of about 1.27 cm.

The auger may have a pitch of about 1.27 cm.

The auger may have thickness of the thread of about 0.66 cm.

The condenser may have a length of about 150 cm.

The condenser may have a volume of about 12 L.

The light vacuum may be maintained by a pump.

The separation chamber may comprise a cyclonic separator operatively coupled to the separation chamber entrance, and a pump may be operatively coupled to the second reservoir exit, for maintaining a light vacuum within the reactor.

The light vacuum within the reactor may be maintained with a pump operatively coupled to the vapor reservoir exit.

The pump may have a suction capacity of about 7 L/min to about 10 L/min.

According to another embodiment, there is provided a process for the thermochemical treatment of a matter containing organic compounds comprising step a):
a) performing a thermal treatment of the matter with the system to obtain the solid separated from the vapor.

The matter may be a biomass.

The biomass may be animal droppings.

The animal droppings may be chosen from cow dung, pig manure, horse manure, poultry manure and sheep manure.

The animal droppings may be pretreated to obtain a dried matter.

The biomass may contain less than about 10% humidity.

The biomass may contain from about 3% to about 10% humidity.

The biomass may contain about 6% humidity.

The biomass may have a granulometry of from about 1 mm to about 3 mm.

The granulometry may be about 1.67 mm.

The residence time of the biomass within the thermochemical reaction chamber may be from about 0.5 second to about 10 seconds.

The heat transfer rate of the treatment may be about 0.148 W/mm$^2$.

The biomass feed rate of the system may be from about 0.5 kg/h to about 1.5 kg/h.

The biomass feed rate may be about 1.07 kg/h.

The thermal treatment may be a pyrolysis treatment.

The solid may comprise a biochar.

The process of the present invention may be further comprising step b):
  b) condensing the separated vapor to produce a condensed vapor fraction.

The pyrolysis may be performed at about 400° C. to about 600° C.

The pyrolysis may be performed at about 475° C. to about 525° C.

The pyrolysis may be performed at about 498° C.

The process of the present invention may be further comprising step a'), before step a):
  a') purging the system by injection of an inert gas, and maintaining a light vacuum therein.

The inert gas may be chosen from neon, argon, nitrogen, helium, or combinations thereof.

The light vacuum may be at a pressure of about 500 mm Hg.

According to another embodiment, there is provided a process for the thermochemical treatment of a matter containing organic compounds comprising step a):
  a) performing a thermal treatment of the matter with the system to obtain the solid separated from the vapor,
and the thermal treatment may be a torrefaction treatment.

The solid may comprise a torrefacted solid.

The torrefaction treatment may be performed at about 200° C. to about 320° C.

The thermal treatment may be a gasification treatment.

The solid may comprise a substantially mineral solid.

The gasification treatment may be performed at about 700° C. to about 1200° C.

The gasification treatment may be performed in presence of steam or oxygen.

The process of the present invention may be further comprising step c), after step b):
  c) collecting the biochar, the condensed vapor fraction and/or a non-condensed fraction of the separated vapor.

The non-condensed fraction of the separated vapor may be used as a combustible for heating with the first heat source, the second heat source, or both.

A biochar may be produced by the process of the present invention.

A bio-oil may be produced by the process of the present invention.

A non-condensed fraction of separated vapor may be produced by the process of the present invention.

The following terms are defined below.

The term "matter containing organic compounds" is intended to mean agricultural biomass in the form of solid or semisolid fractions of animal droppings, (e.g. cow dung, pig, horse, poultry and/or sheep manure); food processing industry biomass (e.g. food waste, and beer brewing waste); forest and wood products industry biomass (e.g. forest, wood construction, and peat waste); municipal treatment plant waste (e.g. sewage sludge and solid waste); energy products industry (e.g. microalgael biofuel production, cellulosic methanol production, and bio-digestion wastes), as well as other matters containing organic compounds such as waste plastics.

The term "granulometry" is intended to mean the different particle size in a granular material.

The term "torrefaction" is intended to mean a mild form of pyrolysis at temperatures typically ranging between 200 to 320° C.

The term "pyrolysis" is intended to mean the chemical decomposition of organic compounds by heating that occurs spontaneously at high enough temperatures. The word is coined from the Greek-derived elements pyro "fire" and lysys "decomposition".

The term "about" is intended to mean, that a numerical value encompasses the typical variation in measuring the value, in an embodiment plus or minus 10% of the numerical value.

The term "light vacuum" is intended to mean that the pressure inside the reactor is intended to be 500 to 600 mm Hg.

The term "vapor" is intended to mean a substance in the gas phase at a temperature lower than its critical point.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 2 illustrates a front view of the reactor used by the system shown in FIG. 1;

FIG. 3 illustrates a top view of the reactor of FIG. 2;

FIG. 4 illustrates a sectional view of the reactor of FIG. 2 according to the plane of section 4-4 shown in FIG. 3;

FIG. 16 illustrates a cyclonic separator according to another embodiment of the present invention.

It will be noted that throughout the appended drawings, like features are identified by like reference numerals.

FIG. 17 illustrates a cyclonic separator according to another embodiment of the present invention.

FIG. 18 illustrates a cyclonic separator according to another embodiment of the present invention.

FIG. 19 illustrates a cyclonic separator according to another embodiment of the present invention.

FIG. 20 illustrates a cyclonic separator according to another embodiment of the present invention.

FIG. 21 illustrates a cyclonic separator according to another embodiment of the present invention.

FIG. 22 illustrates a cyclonic separator according to another embodiment of the present invention.

DETAILED DESCRIPTION OF THE PREFERRED EMBODIMENTS

Figure 1:
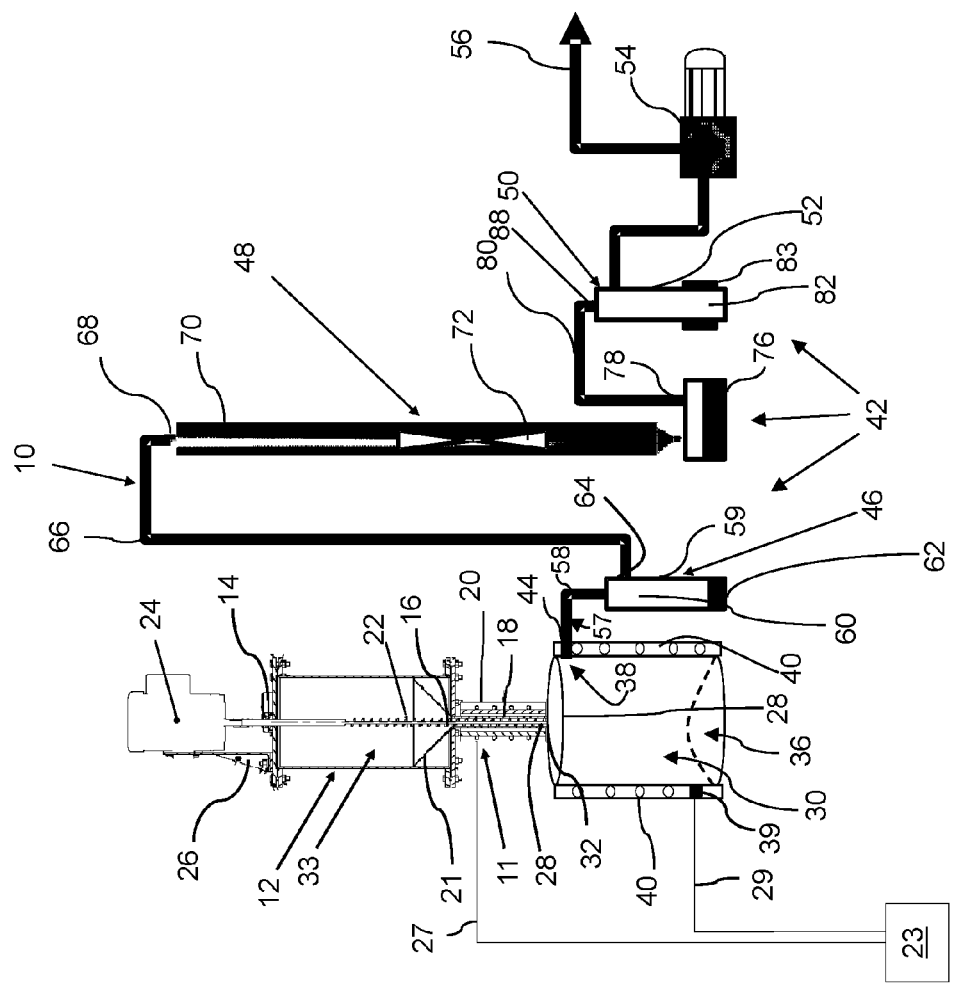
FIG. 1 illustrates diagram showing a thermochemical treatment system according to an embodiment of the present invention.

In embodiments there is disclosed a thermochemical system for the treatment of matter containing organic compounds such as biomass. Referring now to the drawings, and more particularly to FIG. 1, according to an embodiment, there is shown a thermochemical treatment system generally represented by 10, which includes a reactor 11 equipped with a feedstock reservoir 12 in the form of a metal cylinder closed at its upper and lower ends by top and bottom walls 13, 15. According to an embodiment, the top and bottom wall 13, 15 may be bolted and sealed with high temperature gaskets 17 and 17'. The top wall 13 includes a reservoir entry, such as access door 14 such that as shown in FIGS. 2-4, by which matter to be treated can be added periodically. Bottom wall 15 also includes a reservoir exit 16. According to an embodiment, reservoir exit 16 may be coupled to the end of a funnel 21 disposed at the bottom of the feedstock reservoir 12, such that as shown in FIG. 4.

The matter containing organic compounds that can be processed using the system 10, as will be described below, can be of various types, including: agricultural biomass in the form of solid or semisolid fractions of animal droppings, such as cow dung, pig manure, horse manure, poultry (e.g. chicken) manure and sheep manure; food processing industry biomass in the form of food waste and beer brewing waste; forest and wood products industry biomass in the form of forest waste, wood construction waste and peat waste; municipal treatment plant waste in the form of sewage sludge and solid waste; energy products industry in the form of microalgeal biofuel production waste, cellulosic methanol production waste and bio-digestion wastes; as well as other matters containing organic compounds such as waste plastics. In order to provide a sufficient amount of solid particle, the agricultural type of biomass may require pretreatment for solid/liquid separation. According to some embodiments, for example, the pretreatment may be performed using a centrifuge, a filter or by separation at the source followed by drying, for example in a dryer, a screw press or a rotating drum. In the example shown, the access door 14 is bolted and sealed with high temperature seals. However, any other suitable means of closure, such as a clamp lever can be used. In addition, the feedstock reservoir 12 can be adapted for use in continuous mode, using appropriate devices such as an airlock. According to an embodiment, the reactor 11 includes a thermochemical reaction chamber 18, which may be of tubular shape, or any other appropriate shape, disposed vertically in line with the feedstock reservoir 12 and having an entrance 19 coupled to the reservoir exit 16 as shown in FIG. 4.

According to an embodiment, as shown in the example, the inner diameter of thermochemical reaction chamber 18 is about 2.5 cm, and its length is about 25 cm. The reactor 11 includes a first heat source 20. According to an embodiment, as shown in section in FIG. 4, the first heat source 20 may be a cylindrical electrical block in thermal contact with the wall of the thermochemical reaction chamber 18 to ensure the transfer of heat energy needed to reach the required temperature for the thermochemical reaction, typically 400-600° C. for pyrolysis. According to an embodiment, the temperature in the thermochemical reaction chamber 18, may be measured by a first temperature sensor 35 (thermocouple) positioned inside the chamber as shown in FIG. 4, and controlled by a thermostat as part of a controller, such as control computer 23 receiving the temperature indicative signal from the first temperature sensor via line 27, for example. Other means of connecting the temperature sensor to the controller, such as wirelessly, are also contemplated. The power supply employed in the present example uses two heater cartridges model 3618k476 provided by McMaster-Carr (CA, United States), having a capacity of 1500 W each. In embodiments, any other types of heat sources, such as heat produced by the combustion of solid, liquid or gaseous fuel, convection heat transfer using a liquid or gas, by microwave or by induction, can be used in place of electric power. According to some embodiment, the first heat source may be chosen from electrical blocks, combustion heat sources, heat transfer fluids, heat transfer gases, microwave sources, induction blocks, or combinations thereof.

According to an embodiment, the reactor 11 includes at least one feeder 33, which includes at least one auger 22, coupled to a geared motor 24 by a ring 25. According to an embodiment, the speed of the geared motor may be adjustable speed [20-300 revolutions per minute (RPM)]. According to an embodiment, the feeder 33 may be mounted on the feedstock reservoir 12 by a support 26. The feeder 33 drives the matter through the thermochemical reaction chamber 18, to its exit 28. According to an embodiment, in the example shown, the auger 22 has an exterior diameter of about 2.5 cm (to allow free insertion into the thermochemical reaction chamber 18), a core diameter of about 1.27 cm, a pitch of about 1.27 cm and a thickness of thread about 0.66 cm. According to another embodiment, optionally, a pair of augers 22 can be used in order to promote self-cleaning of the reactor. According to other embodiments, any other configuration of suitable augers, such as shaftless screws guided by a heating cylinder, can be used.

As shown in FIG. 1, the reactor 11 also includes a separation chamber 30, such as a separation tank shown in the example, for separation of biochar 36 from vapor. The separation chamber 30 possesses a separation chamber entrance 32, in communication with the thermochemical reaction chamber exit 28 of the thermochemical reaction chamber 18 to receive and separate the products reaction, which particularly include the biochar 36 and vapor. According to an embodiment, the biochar 36 is collected at the bottom of the separation chamber 30 by gravity, while the vapor is discharged through a separation chamber exit 38. Any other type of appropriate separation chamber, such as a cyclone coupled with a means of collection of the biochar 36 can be used. According to an embodiment, the separation chamber 30 further includes a separation device to favor separation of the biochar 36 from the vapor. According to an embodiment, such separation device may include a second heat source 40 shown in FIG. 1 in the form of two lateral electric power blocks of 2000 W each, thermally coupled with the wall of the separation chamber 30 to indirectly heat the biochar and vapor to maintain a sufficient temperature to substantially maintain vapor in a gaseous state by avoiding condensation of vapor in the separation chamber 30 before it is evacuated through separation chamber exit 38, while promoting the evacuation flow of vapor.

Figure 15:
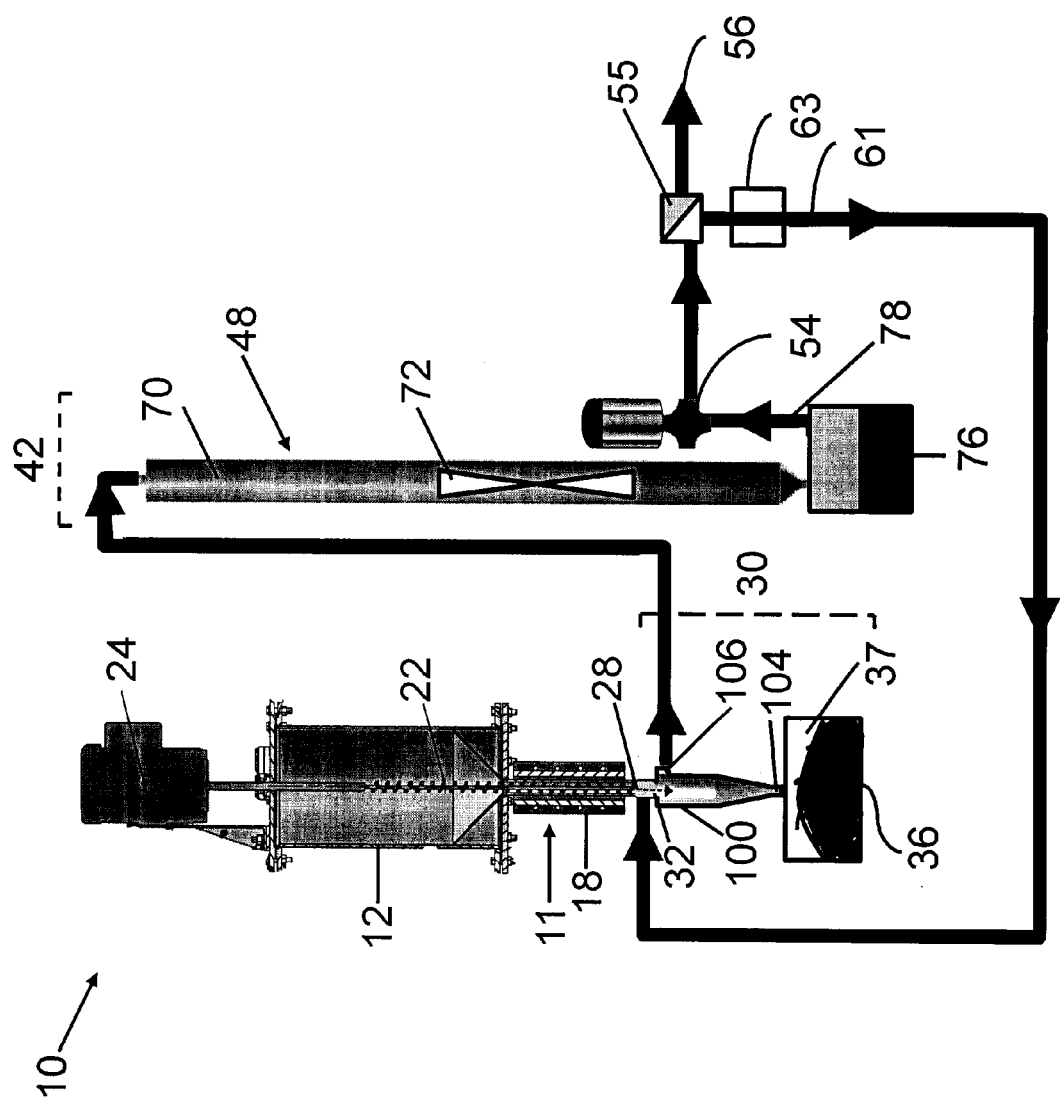
FIG. 15 illustrates diagram showing a thermochemical treatment system according to another embodiment of the present invention.

According to another embodiment of thermochemical treatment system shown in FIG. 15, the separation device may include a cyclonic separator 100 to separate biochar 36 from the vapor. The cyclonic separator 100 is for receiving the solid and the vapor at the separation chamber entrance 32. The cyclonic separator 100 also operates to substantially maintain vapor in a gaseous state before they are evacuated through gas line exit 106 which is forming the separation chamber exit, while trapping the fine particles of biochar 36 carried by the pyrolytic vapors. The biochar 36 is discharged to a biochar reservoir 37 as part of the separation chamber 30. Exemplary dimensional and operational parameters of such a cyclonic separator 100 adapted to a feed rate of 1 kg/h are given in Table 1.

TABLE 1

| | |
|---|---|
| Inlet width, cm | 2.54 |
| Inlet height, cm | 5.08 |
| Inlet area, m$^2$ | 0.00129 |
| Dc, cyclone diameter, cm | 10.16 |
| Cyclone height, cm | 40.64 |
| Flow [Q, l/s] | 35.5 |
| Speed [Vs, m/s] | 27.94 |
| Flow [Q, Nm$^3$/h] | 128 |

FIGS. 16 to 22 show different views of an exemplary design for such a cyclonic separator 100. The inlet of the cyclonic separator 100 will be connected to the thermochemical reaction chamber exit 28 of the thermochemical reaction chamber 18 through cyclonic separator entrance 102, which is forming the separation chamber entrance 32, as shown in the FIG. 15. The biochar 36 can be collected at the bottom of the biochar reservoir 37 which would be connected to the cyclonic separator exit 104. The gas exit line 106 of the cyclonic separator 100 is forming the separation chamber exit, and may be connected to a gas pump 54 to attain required gas velocity inside the cyclone.

According to an embodiment, the temperature in the separation chamber 30 is measured by a second temperature sensor 39 (thermocouple) placed in the separation chamber 30, and controlled by a second thermostat as part of o the controller, such as control computer 23 receiving the temperature indicative signal from the second temperature sensor via line 29, for example. Other means of connecting the second temperature sensor to the controller, such as wirelessly, are also contemplated.

In embodiments, any other types of heat sources, such as heat produced by the combustion of solid, liquid or gaseous fuel, convection heat transfer using a liquid or gas, by microwave or by induction, can be used in place of electric power. According to some embodiment, the second heat source may be chosen from electrical blocks, combustion heat sources, heat transfer fluids, heat transfer gases, microwave sources, induction blocks, or combinations thereof. According to some embodiment, it is preferable to cover the elements of the reactor 11 with thermal insulation materials, so as to reduce the time to achieve the optimum temperature of operation of the reactor 11, while at the same time reducing operating costs by reducing heat loss.

According to an embodiment, the system 10 includes a vapor processing unit 42 provided with a vapor processing unit entrance 44. The vapor processing unit 42 is in communication with the separation chamber 30 through a first conduit 57 connected to separation chamber exit 38, to collect the products vaporized during the thermochemical reaction. The vapor processing unit 42 may include one or more processing sections, each of which can be formed of a condenser, vapor collector and bio-oil collector.

According to an embodiment, the first conduit 57 can also be heated, for example using an electrical heating tape 58, to prevent condensation downstream of the vapor processing unit 42. According to an embodiment, in the example shown in FIG. 1, the vapor processing unit 42 consists of three sections, namely a first section 46 for collecting vapors and bio-oil, a second section 48, for condensing and collecting bio-oil, followed by a third section 50 for collecting a non-condensed fraction of the vapors mainly constituted of non-condensable gases, whose vapor reservoir exit 52 is coupled to a suction pump 54, which maintains a light vacuum in the system 10.

According to an embodiment, the collected gas may be recovered through an outlet 56 of the vapor processing unit 42. According to another embodiment, the first section 46 for collecting vapor and bio-oil consists of a first reservoir 59 which has a vapor receiving upper portion 60 for receiving and collecting the vapor routed through first conduit 57. First reservoir 59 may be maintained at a temperature sufficiently lower than that of the separation chamber 30, so as a first fraction of bio-oil condenses and accumulates in the lower portion of the first reservoir 59 used as bio-oil collector 62. According to an embodiment, maintaining the temperature of the first reservoir 59 at ambient (e.g. room temperature) temperature is adequate to achieve some condensation, in the context of this example. The first reservoir 59 is provided with a first reservoir exit 64, preferably in communication with the vapor receiving upper portion 60, to remove the fraction of non-condensed collected vapors, for routing them via a second conduit 66 to the input 68 of the second section 48, for condensation and collection of bio-oil. According to an embodiment, the second section 48 may include a bio-oil condenser and collector, which may contain a condenser 70 with a cooler 72. The cooler 72 may be controlled by a thermostat to maintain the temperature in the condenser at a level allowing condensation of a second fraction of bio-oil to maximize bio-oil yield. The condensed bio-oil may flow through a condenser outlet 74 in communication with a second reservoir 76 for collecting the second fraction of bio-oil in the lower part of the second reservoir 76.

According to an embodiment, the condenser 70 may be an aluminum cylinder (10 cm diameter, 150 cm long, 12 liters) whose temperature is maintained around −10° C. using a cooler 72. For example, cooler 72 in the form of a copper tube wound in a spiral inside the cylinder to circulate a cooled organic solvent, has proven functional in combination with a second reservoir 76 of about 2 liters placed in an ice bath and cooled about −10° C. The second reservoir 76 is provided with a second reservoir exit 78 in its upper portion to remove the fraction of non-condensed vapor collected.

According to another embodiment shown in FIG. 15, in the case when a cyclonic separator 100 is used, the suction pump 54 can be operatively coupled to the exit 78 of the second reservoir to obtain sufficient gas velocity inside the cyclonic separator 100 while providing light vacuum within the thermochemical treatment system 10. It can be appreciated that a third section for vapor collection may be omitted when a cyclonic separator is used in combination with a recirculation line 61 connected to a control valve 55, in order to redirect a percentage of pyrolytic vapors to the separation chamber entrance 32, while the remaining vapors can be collected at outlet 56. The line 61 may be provided with a heater 63 to prevent condensation of vapors recirculated to the cyclonic separator. Therefore, it is possible to optimize the pyrolytic vapor recirculation ratio in such a manner that no significant vapor condensation occurs at outlet 56. This modification eliminates several units from the vapor separation unit 42 and improves process economy.

According to another embodiment, the non-condensed fraction of the vapors mainly constituted of non-condensable gases may be routed via a third conduit 80 to vapor reservoir entrance 88 of the third section 50 to collect the non-condensed vapor. According to an embodiment, the third section 50 may include a vapor reservoir 82 for collecting non-condensed vapor, which may consist of substantially of non-condensable gases. The vapor reservoir 82 can also be cooled using a cooler 83, to a temperature low enough to condense the residual condensable portion of the vapor, in order to allow only non-condensable gases to be evacuated under the action of the suction pump 54. According to an embodiment, a pump suction capacity of at least 7-10 L/min can be used with the system of the present invention. It should be noted that the volume of the components of the vapor processing unit 42, including first and second reservoirs 59 and 82 and condenser 70, must be determined by the residence time of the vapor in the vapor processing unit 42.

The gases exiting through outlet 56 of the vapor processing unit 42 can be compressed and stored in suitable tanks. These gases can be used as fuel, particularly when the combustion means are used as heat sources 20, 40 for the thermochemical reaction chamber 18 and the separation chamber 30.

According to another embodiment, there is disclosed process for the thermochemical treatment of a matter containing organic compounds by performing a thermal treatment of the matter with a system of the present invention.

According to another embodiment, system 10 can also be used for torrefaction or gasification of matter by adjusting the operating parameters and adapting the design of the system 10. According to an embodiment, torrefaction may be achieved by lowering the operating temperature of the thermochemical reaction chamber 18 to a temperature between about 200° C. and about 320° C. According to an embodiment, gasification can be achieved by increasing the temperature of the thermochemical reaction chamber 18, typically to temperatures between about 700° C. and 1200° C. in the presence of oxygen or steam, so as to produce syngas mainly containing $H_2$ and CO, for use as combustible or in the synthesis of organic compounds, and a substantially mineral solid (ashes) free of non-cracked compounds (e.g. tars) that can be used as raw material such as filler used in concrete mix.

According to another embodiment, to obtain the reduced oxygen conditions required for the pyrolytic reaction, the air is purged from the system initially by injecting an inert gas such as nitrogen, and the system is kept under a light vacuum with a source of vacuum. For example, the source of vacuum may be the use of suction pump 54.

To maintain the necessary amount of heat in the area of thermochemical reaction and to avoid excessive heating of other sections of the reactor 11, the temperature sensors (thermocouples) were placed in different locations of the reactor, as defined below.

Figure 5:
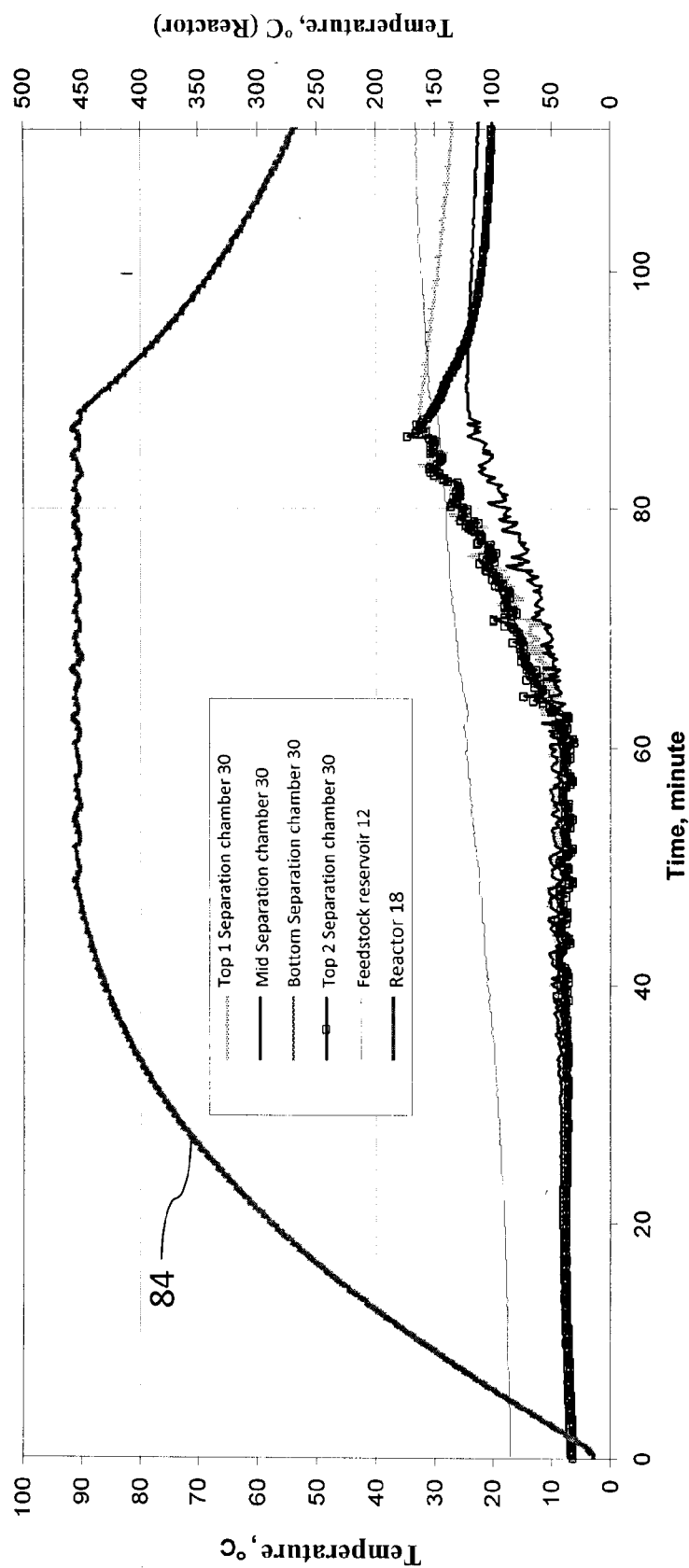
FIG. 5 illustrates a graph showing the temperature profiles as a function of time at different locations of the reactor, when the reaction chamber is heated to a pyrolysis temperature of 450° C., without indirect heating of the contents of the separation chamber.
Figure 6:
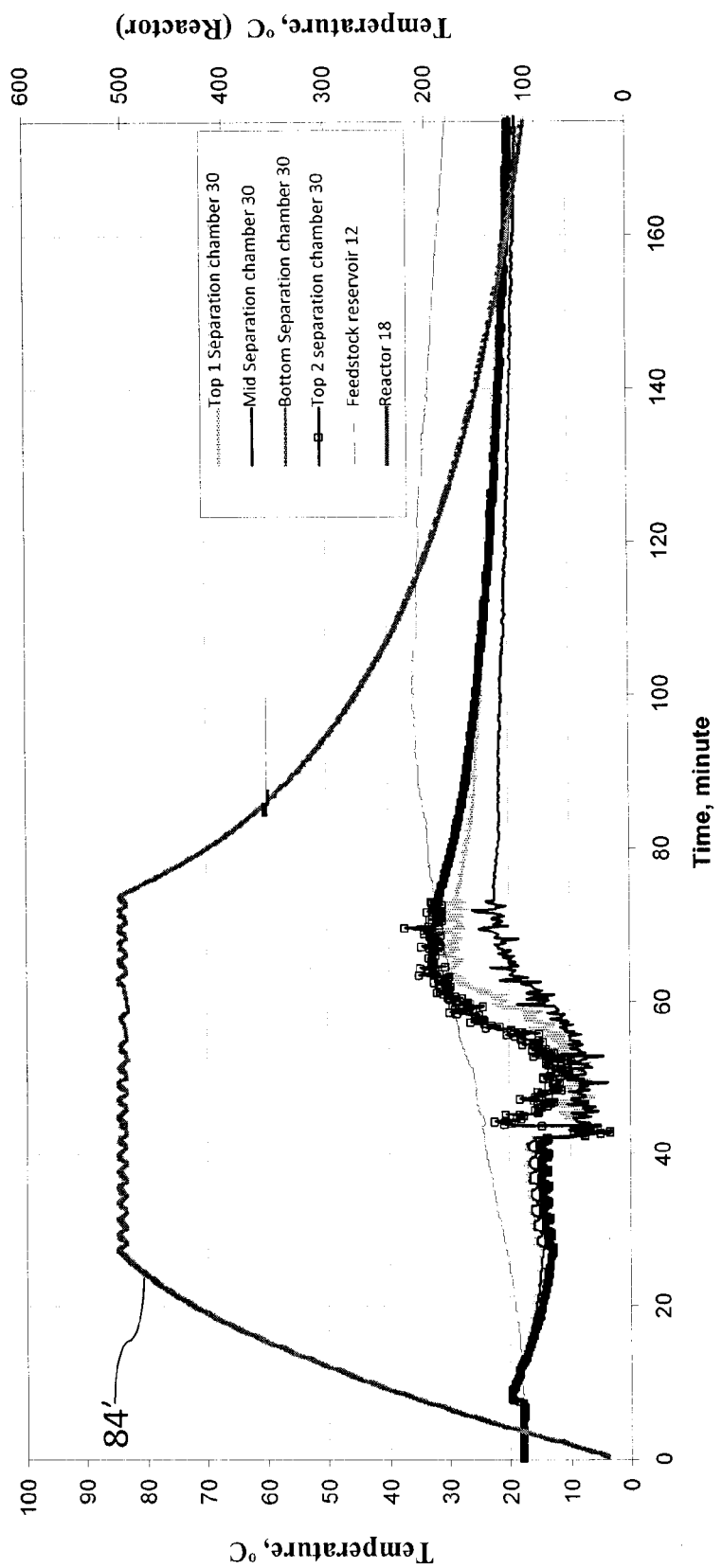
FIG. 6 illustrates a graph showing the temperature profiles as a function of time at different locations of the reactor, when the reaction chamber is heated to a pyrolysis temperature of 500° C., without indirect heating of the contents of the separation chamber.
Figure 7:
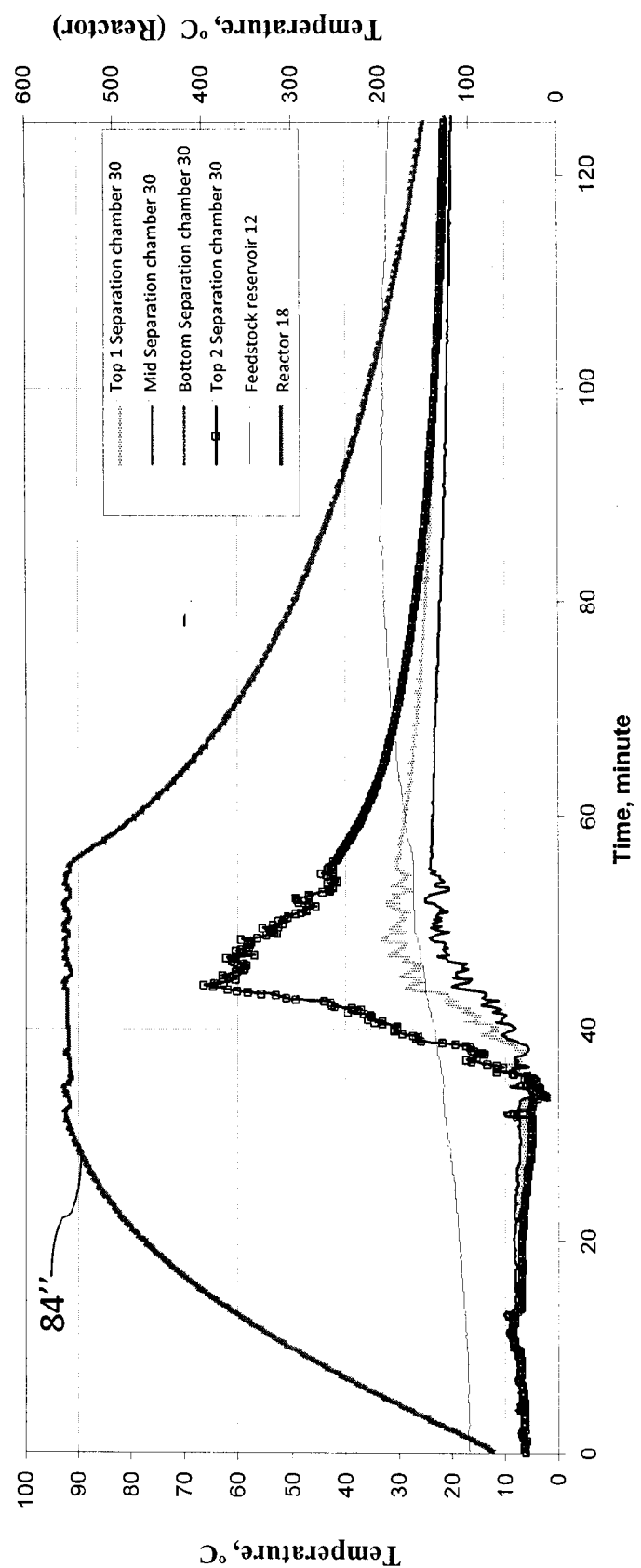
FIG. 7 illustrates a graph showing the temperature profiles as a function of time at different locations of the reactor, when the reaction chamber is heated to a pyrolysis temperature of 550° C., without indirect heating of the contents of the separation chamber.

FIGS. 5, 6 and 7 present the temperature profiles of the top, middle and bottom sections of separation chamber 30, the pyrolysis zone associated with the thermochemical reaction chamber 18 and the feedstock reservoir 12, for pyrolytic reaction conditions without indirect heating of the contents of the separation chamber 30. The pyrolysis temperatures represented are of 450° C., 500° C., and 550° C., respectively, at a matter feed rate of about 1.0 kg/h with a particle size less than about 3 mm. In these graphs (FIGS. 5, 6 and 7), profiles 84, 84' and 84" recorded for the thermochemical reaction chamber 18 show a steady trend of temperature, which rises to reach the set temperature and which remains constant during pyrolysis, and then decreases when heating of the thermochemical reaction chamber 18 is stopped at the end of the test. Temperatures in other parts of the reactor 11 all display irregular trends. The graph in FIG. 5 shows steady increases in these other locations throughout the pyrolysis reaction, while FIGS. 6 and 7 indicate that the temperatures rise, reach a peak value and then decrease without a plateau. These abrupt changes observed in the temperature profiles were caused by the opening of the valve of pump 54 to evacuate brown fumes which appeared in the duct system. Initially, during testing at 450° C., no portion of the reactor was insulated. Subsequently, for tests at 500° C. and 550° C., the first heat source 20 was insulated with glass wool, which favorably increased the heating rate and reduced the heating time by about 10 min. Also, except for the temperature measured in the thermochemical reaction chamber 18, the temperatures measured at the other locations of the reactor 11 remained below 40° C., causing partial condensation of pyrolytic vapor in the separation chamber 30, despite the purging of the reactor with a nitrogen flow rate of approximately 1.5 L/min for the rapid evacuation of pyrolytic vapor from the reactor 11.

According to an embodiment, to avoid condensation of vapor and quickly evacuate them from the system, the biochar and vapor contained in the separation chamber 30 may be indirectly heated to maintain a sufficiently high temperature to avoid condensation of vapor in the separation chamber 30 before it is discharged through the separation chamber exit 38, while promoting the evacuation flow of vapor. According to the present exemplary pyrolytic reaction, the temperature of the separation chamber 30 may be between about 200° C. and about 250° C. and the reaction chamber may be heated to a temperature between about 450° C. and about 520° C. using the control computer 23.

The ranges of operating parameters of the process of fast pyrolysis of the present invention tested, and their optimum values for maximum bio-oil yield from biomass consisting of a solid fractions are:

Dryness of biomass (slurry solid fraction): 90-97% (less than 10% moisture), 94% optimal.

Granulometry (particle size): between about 1 mm and about 3 mm. 1.67 mm optimal.

Pyrolysis temperature: between about 400° C. and about 600° C., more specifically between about 475° C. and about 525° C., and 498° C. optimal.

Residence time: between about 0.5 sec and 10 sec.

Rate of heat transfer: 0.148 W/mm$^2$ (95.5 W/po$^2$) optimal.

Feed rate: between about 0.5 to about 1.5 kg/h; 1.07 kg/h optimal.

Suction speed of the pump: between about 7 L/min and 10 L/min.

Pressure: 500 mm Hg.

A typical mass balance obtained from use of the system and method of the present invention under these conditions is: biomass (1000 g); biochar (270 g); first fraction of bio-oil (372 g); second fraction of bio-oil (248 g); gas 110 g.

Figure 8:
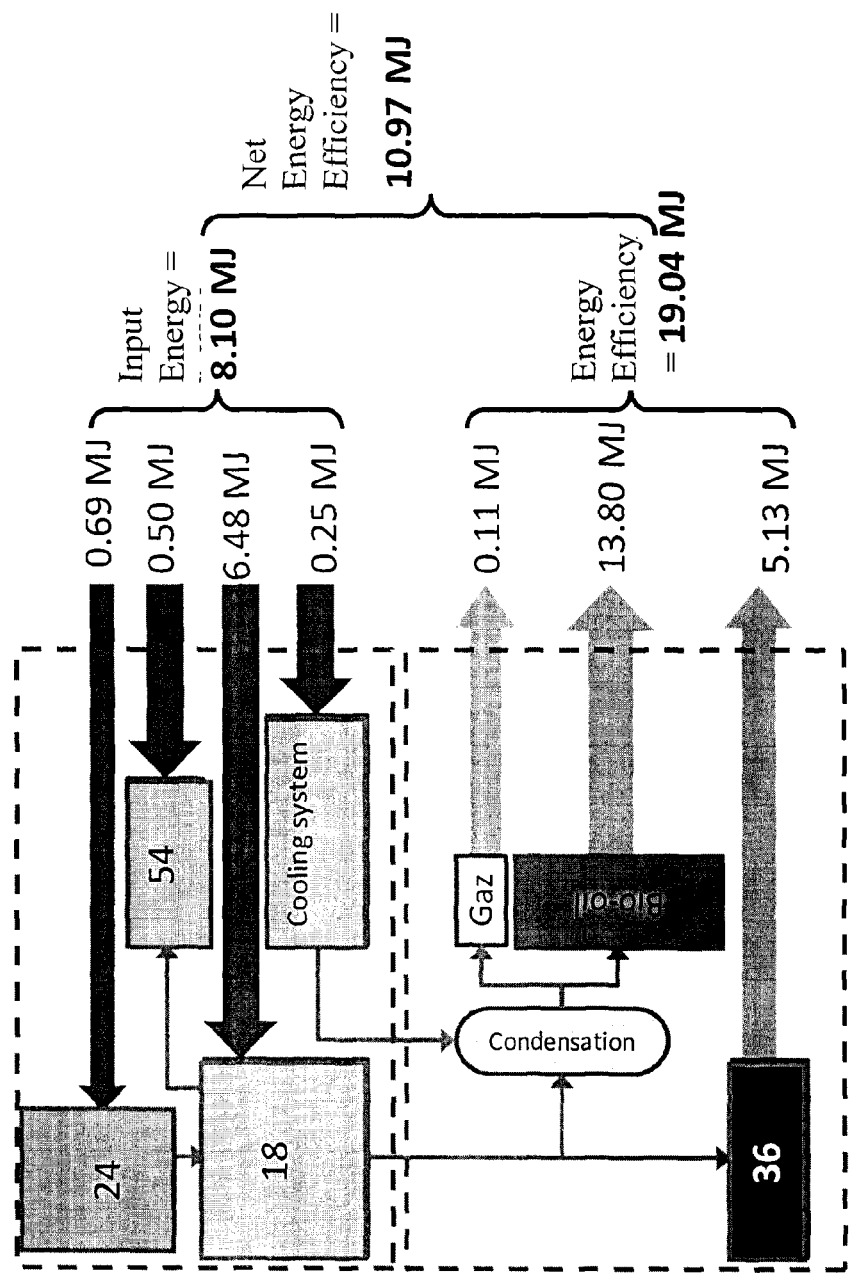
FIG. 8 illustrates a diagram showing a typical heat balance of the process of the present invention obtained under optimal conditions of operation.

FIG. 8 illustrates a typical heat balance (per kg of biomass) of the process of the present invention that can be obtained under these conditions. The energy supplied by the pyrolysis products is typically 135% greater than the energy required to operate the process.

The vertical orientation of the reactor 11 makes it particularly suitable for separating a substantial portion of biochar from the pyrolysis vapor simply by gravity. In addition, unless the matter to be treated has a tendency to agglomerate, it is usually not necessary to use additional means of dissociating the matter, such as vibration or shaking of the matter bed in the feedstock reservoir 12 as required by other technologies. The pyrolysis vapor is directed with the solid fraction of matter processed to the thermochemical reaction chamber exit 28 of the reaction chamber 18 to be separated in the separation chamber 30 and removed by suction to the vapor processing unit 42. According to the embodiment of thermochemical treatment system as described above in view of FIG. 1, the evacuation flow of vapor is favored by the indirect heating of biochar and vapor to avoid condensation of vapor in the separation chamber 30. Furthermore, the thermochemical treatment system 10 is compact and relatively inexpensive, and the proposed process can be implemented in a mobile unit or a permanent installation on the site of matter processing.

The present invention will be more readily understood by referring to the following examples which are given to illustrate the invention rather than to limit its scope.

Example 1

Modeling of Optimal Operation Parameters

To determine the optimal operating parameters of a pyrolysis process according to the present invention, including the reaction temperature, the feed rate of biomass and its granulometry (particle size), to maximize the yield of bio-oil, the method of Box-Behnken was applied for these three parameters (factors) for three levels each with three replicates at the central point. The general form of the Box-Behnken model for these three factors can be represented by the following equation:

$$PC\_OIL = \beta_0 + \beta_1 TEMP + \beta_2 FEEDRATE + \beta_3 SIZE + \beta_4 (TEMP*TEMP) + \beta_5 (FEEDRATE*TEMP) + \beta_6 (FEEDRATE*FEEDRATE) + \beta_7 (SIZE*TEMP) + \beta_8 (SIZE*FEEDRATE) + \beta_9 (SIZE*SIZE) + \epsilon$$

where:

PC_OIL is the percentage of bio-oil;

$\beta_0$-$\beta_9$ are the regression coefficients, and $\epsilon$ is the random error term from a normal distribution with mean 0 and variance $\sigma^2$.

A total of 15 trials according to an experimental plan of Box-Behnken programmed as shown in Table 2 were performed in random order.

TABLE 2

| No. | Temperature (° C.) | Biomass feed rate (kg/hr) | Particles size (mm) |
|---|---|---|---|
| 1 | −1 | −1 | 0 |
| 2 | 1 | −1 | 0 |
| 3 | −1 | 1 | 0 |
| 4 | 1 | 1 | 0 |
| 5 | −1 | 0 | −1 |
| 6 | 1 | 0 | −1 |
| 7 | −1 | 0 | 1 |
| 8 | 1 | 0 | 1 |
| 9 | 0 | −1 | −1 |
| 10 | 0 | 1 | −1 |
| 11 | 0 | −1 | 1 |
| 12 | 0 | 1 | 1 |
| 13 | 0 | 0 | 0 |
| 14 | 0 | 0 | 0 |
| 15 | 0 | 0 | 0 |

The raw data were processed using the SAS® software (SAS Institute) as presented in Table 3.

TABLE 3

| No. (DATE) | Temperature (° C.) | Biomass feed rate (kg/hr) | Particles size (mm) | Bio-oil % | Biochar % | g % |
|---|---|---|---|---|---|---|
| 1 (26 Apr. 2010) | 525 | 0.5 | 2 | 35.18 | 45.42 | 1 |
| 2 (21 Apr. 2010) | 475 | 0.5 | 2 | 47.16 | 40.74 | 1 |
| 3 (23 Apr. 2010) | 475 | 1.5 | 2 | 44.76 | 44.44 | 1 |
| 4 (3 May 2010) | 525 | 1.5 | 2 | 50.91 | 38.39 | 1 |
| 5 (5 May 2010) | 475 | 1.0 | 1 | 54.25 | 35.15 | 1 |
| 6 (4 May 2010) | 525 | 1.0 | 1 | 50.93 | 38.67 | 1 |
| 7 (16 Apr. 2010) | 475 | 1.0 | 3 | 42.53 | 43.57 | 1 |
| 8 (15 Apr. 2010) | 525 | 1.0 | 3 | 45.58 | 37.42 | 1 |
| 9 (6 May 2010) | 500 | 0.5 | 1 | 51.16 | 40.24 | 8 |
| 10 (7 May 2010) | 500 | 1.5 | 1 | 47.47 | 35.63 | 1 |
| 11 (20 Apr. 2010) | 500 | 0.5 | 3 | 46.37 | 43.23 | 1 |
| 12 (19 Apr. 2010) | 500 | 1.5 | 3 | 40.39 | 40.01 | 1 |
| 13 (22 Apr. 2010) | 500 | 1.0 | 2 | 63.29 | 25.91 | 1 |
| 14 (28 Apr. 2010) | 500 | 1.0 | 2 | 60.16 | 27.74 | 1 |
| 15 (29 Apr. 2010) | 500 | 1.0 | 2 | 61.78 | 25.22 | 1 |

The variable percentage of oil (PC_OIL), percentage of biochar (PC_CHAR) and percentage of gas (PC_GAS) are the dependent variables, for which coefficients of code are presented in Table 4.

TABLE 4

| Parameter | Substracted | Divided by |
|---|---|---|
| Temperature ° C. | 500.0 | 25.0 |
| Rate Kg/h | 1.0 | 0.5 |
| Particles size mm | 2.0 | 1.0 |

Table 5 showing the response surface for the variable PC_OIL contains the mean response obtained, which is 49.5. The coefficient of determination $R^2$ of the model, which represents the percentage of variation explained by the model, is 0.91. The estimator of model error variance ($\sigma^2$); given by the square of "root (MSE)" is $3.96^2$, or 15.7. The coefficient of variation is equal to 7.9992.

TABLE 5

| | |
|---|---|
| Average Response | 49.461333 |
| Root (MSE) | 3.956505 |
| Coeff. of determination $R^2$ | 0.9108 |
| Coeff. of variation | 7.9992 |

Table 6 presents the results of sequential F tests. Each F test measures the reduction in the sum of square errors when a group including the linear, quadratic and interaction terms, is added to the model. Overall, the quadratic terms were significant (P=0.0090) but not the interaction terms between factors (P=0.23). This means that the response curve for a given factor maintains the same shape whatever the levels of the other factors. The F corresponding to the model, F=5.67, indicates that the model is significant (P=0.0352).

TABLE 6

| Regression | DF | Type I Sum of Squares | R-Square | F Value | Pr > F |
|---|---|---|---|---|---|
| Linear | 3 | 111.016150 | 0.1265 | 2.36 | 0.1877 |
| Quadratic | 3 | 594.874282 | 0.6777 | 12.67 | 0.0090 |
| Interaction | 3 | 93.629475 | 0.1067 | 1.99 | 0.2335 |
| Total Model | 9 | 799.519907 | 0.9108 | 5.67 | 0.0352 |

Given that there are three repetitions at the central point of the plan of the experiment, it is possible to perform a test of model fit. The "lack-of-fit" test is used to evaluate the proportion of the residual error due to poor fit of the model by separating the total error into two parts: the error due to a poor fit of the model and the pure error due to the difference between repetitions of the tests at identical factors levels. As presented in Table 7, the ratio of sums of squares means of these two errors gives the F statistic "lack-of-fit"=24.46/2.45=9.98. When P<0.05 for testing lack of fit, it means a more complex model including possibly the effects of other factors should be considered. Since P=0.09, there is no sign of poor fit.

TABLE 7

| Residual | DF | Sum of Squares | Mean square | F Value | Pr > F |
|---|---|---|---|---|---|
| "Lack-of-Fit" | 3 | 73.369200 | 24.456400 | 9.98 | 0.0924 |
| Pure error | 2 | 4.900467 | 2.450233 | | |
| Total error | 5 | 78.269667 | 15.653933 | | |

The estimators of the regression coefficients are presented in Table 8, along with standard errors on these estimates, the t-statistic testing the hypothesis that the parameter is 0, and the threshold observed from the test (Pr>t). Among the quadratic terms, FEEDRATE*FEEDRATE is the most significant (P=0.0055), followed by TEMP*TEMP (P=0.0139) and SIZE*SIZE (P=0.0375). None of the interaction terms is significantly different from 0 at the 0.05 level. The weak interaction FEEDRATE*TEMP is marginal (P=0.0705).

TABLE 8

| Parameter | DF | Estimator | Standard Error | t Value | Pr > \|t\| | Estimator of coded data parameter |
|---|---|---|---|---|---|---|
| Interception | 1 | -2788.726667 | 831.763669 | -3.35 | 0.0203 | 61.743333 |
| TEMP | 1 | 11.692167 | 3.302517 | 3.54 | 0.0166 | -0.762500 |
| RATE | 1 | -101.231667 | 81.261005 | -1.25 | 0.2680 | 0.457500 |
| SIZE | 1 | -11.170833 | 40.630502 | -0.27 | 0.7944 | -3.617500 |
| TEMP * TEMP | 1 | -0.012213 | 0.003294 | -3.71 | 0.0139 | -7.632917 |
| RATE * TEMP | 1 | 0.362600 | 0.158260 | 2.29 | 0.0705 | 4.532500 |
| RATE * RATE | 1 | -38.431667 | 8.236122 | -4.67 | 0.0055 | -9.607917 |
| SIZE * TEMP | 1 | 0.063700 | 0.079130 | 0.81 | 0.4574 | 1.592500 |
| SIZE * RATE | 1 | -1.145000 | 3.956505 | -0.29 | 0.7839 | -0.572500 |
| SIZE * SIZE | 1 | -5.787917 | 2.059031 | -2.81 | 0.0375 | -5.787917 |

Table 9 presents an analysis of variance with tests for the four parameters corresponding to each factor: the linear effect, quadratic effect and two interactions with the other two factors. It assesses the importance of the contribution of each factor in the model fit. FEEDRATE factor has the most significant contribution (P=0.0295), followed by time tracking (P=0.0540) and size (0.0866).

TABLE 9

| Factor | DF | Sum of Squares | Squares Average | F Value | Pr > F |
|---|---|---|---|---|---|
| TEMP | 4 | 312.088778 | 78.022194 | 4.98 | 0.0540 |
| RATE | 4 | 426.004239 | 106.501060 | 6.80 | 0.0295 |
| SIZE | 4 | 239.837931 | 59.959483 | 3.83 | 0.0866 |

The results of a canonical analysis (critical value) are presented in Table 10. The analysis was performed to check whether the obtained optimum is a minimum, maximum or saddle point. The stationary point is calculated using the partial derivatives of the regression equation. It was observed that the estimated response surface has its maximum value when TEMP=498° C., FEEDRATE=1.0 kg/h and SIZE=1.7 mm. The predicted percentage of bio-oil obtained from the stationary point is PC_OIL=62.4%. The experimental value for the bio-oil yield under the same conditions was 61.54 wt %, which is in line with theoretical estimates.

TABLE 10

| Factor | Coded | Uncoded |
| --- | --- | --- |
| Temperature | −0.079387 | 498.015334 |
| Rate | 0.014741 | 1.007370 |
| Size | −0.324155 | 1.675845 |

Predicted value at stationary point: 62.363287

The eigenvectors and eigenvalues as presented in Table 11 provide additional information on the shape of the response surface.

TABLE 11

| | Eigenvectors | | |
| --- | --- | --- | --- |
| Eigenvalues | Temperature | Rate | Particles size |
| −5.373456 | 0.511002 | 0.217264 | 0.831669 |
| −6.477284 | 0.657052 | 0.525093 | −0.540887 |
| 11.178010 | −0.554219 | 0.822845 | 0.125570 |

Stationnary point at maximum

Figure 9:
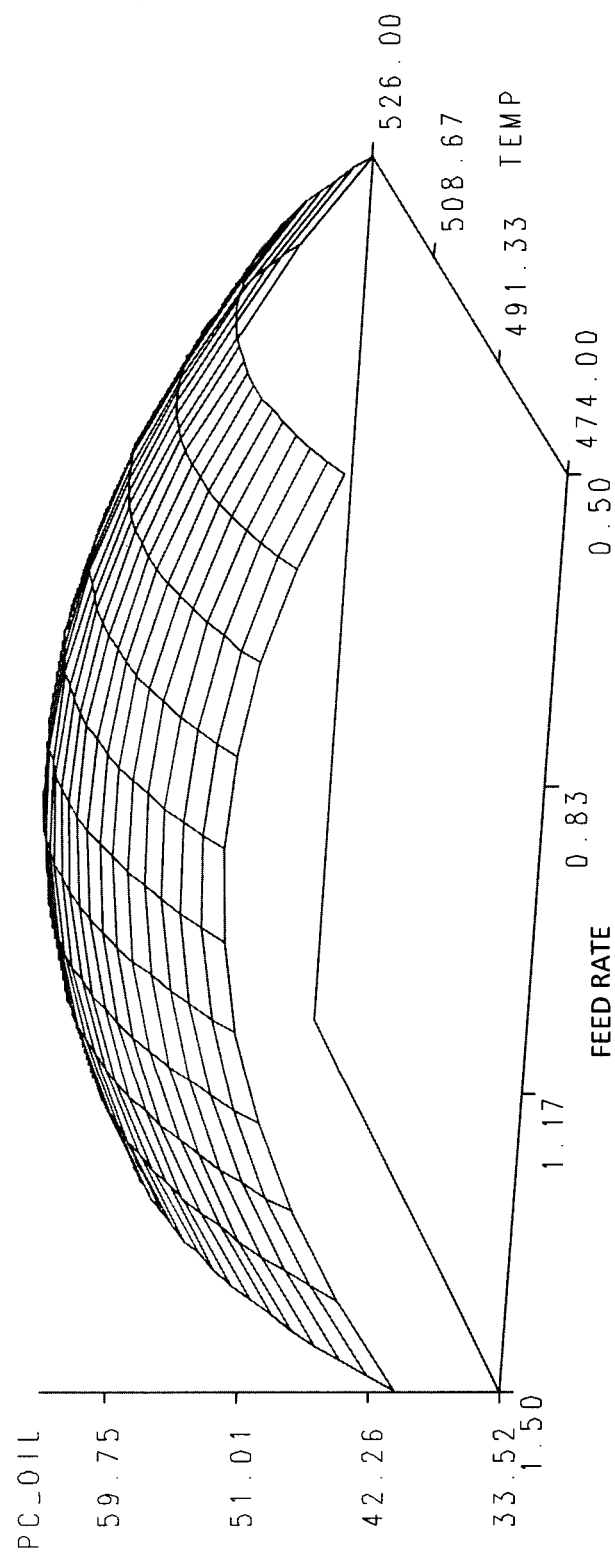
FIGS. 9, 10 and 11 illustrate 3D graphs showing the surface responses of bio-oil yields as a function of feed rate and pyrolysis temperature, plotted for three different granulometry.
Figure 10:
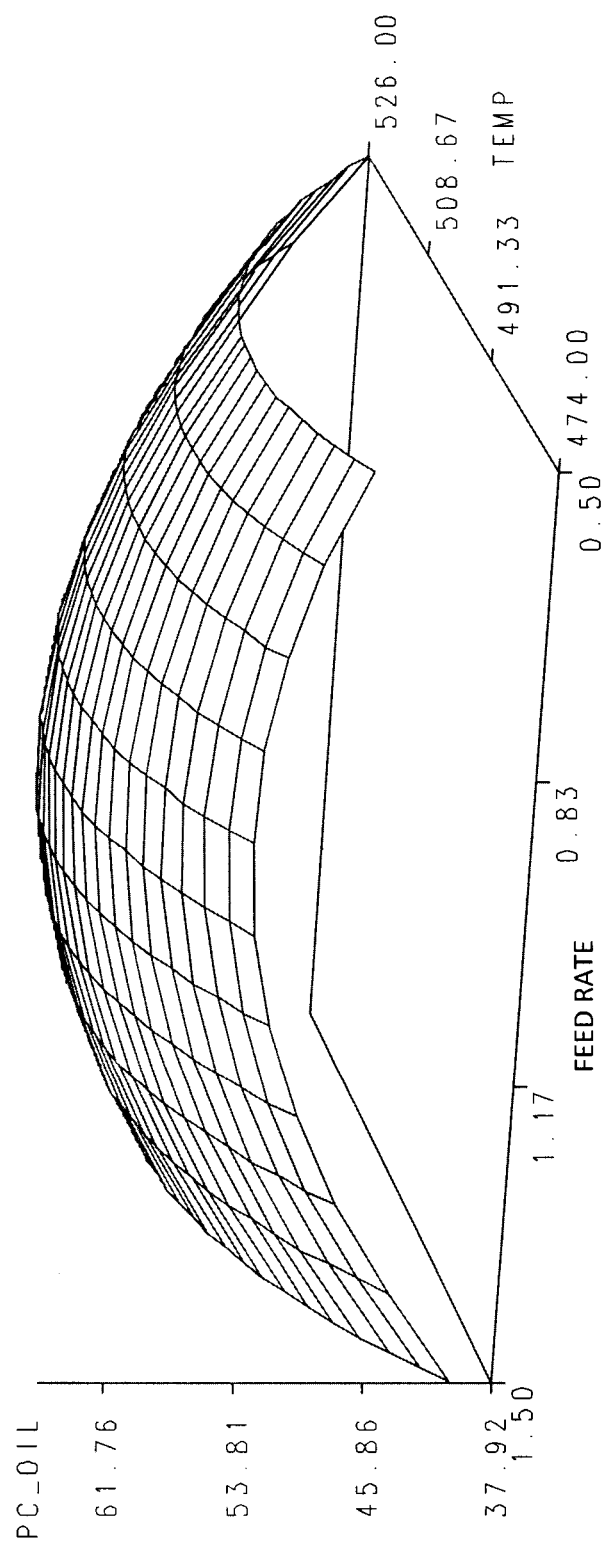
Figure 11:
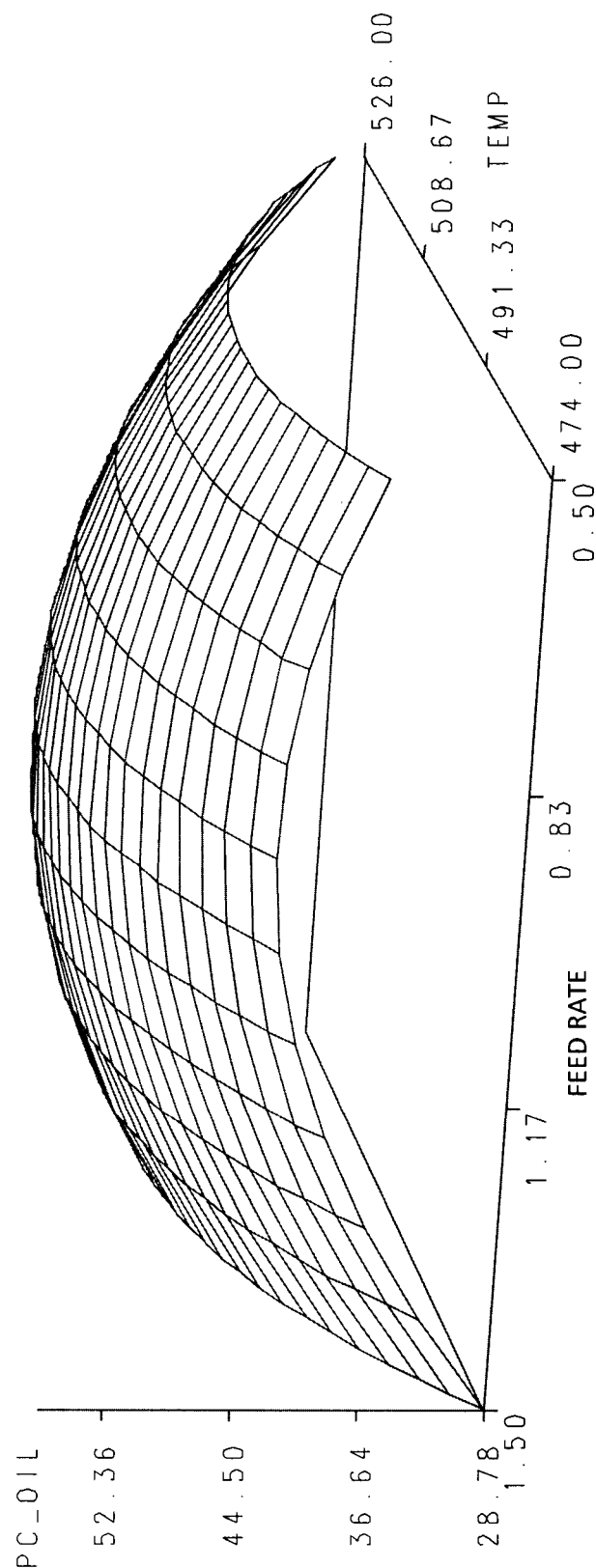

The graphs of FIGS. 9, 10 and 11 illustrate the relationship between three factors and the dependent variable PC_OIL. These 3D graphics show the response surfaces of PD_OIL based on FEEDRATE and TEMP as plotted for three values of SIZE, the least important variable in the model, respectively, for 1 mm, 2 mm and 3 mm. It is found that the shape of the relationship remains similar regardless of the value of SIZE.

Figure 12:
FIG. 12 illustrates a graph showing the temperature profiles as a function of time at different locations of the reactor where the reaction chamber is heated to a pyrolysis temperature of about 498° C., with indirect heating of the contents of the separation chamber.

The temperature profiles of the thermochemical reaction chamber 18 and other locations in the separation chamber 30 and the feeding section are presented on the graph in FIG. 12. It is clear from this graph that the tank temperature coal remains ≥200° C., which prevents the condensation of the pyrolytic vapor at this level. In addition, the use of the suction pump 54 (7-10 L/min) helps to quickly evacuate the pyrolytic vapors of the sensitive area of condensation. The pressure in the pyrolysis reactor is maintained at 500 mm Hg.

The same analysis was also performed for the variables PC_CHAR and PC_GAS. The obtained results suggest that for the variable PC_CHAR, the stationary point is a minimum. The predicted value at this point to PC_CHAR is 26% for temperature values of 500° C., feed rate of 1.0 kg/h and granulometry (particle size) of 1.8 mm. The three quadratic terms of the model are highly significant. Interactions FLOWRATE*TEMP and SIZE*TEMP are also significant.

Thus, of the type of model used to obtain the optimal conditions for production of bio-oil, different results were obtained, the most important being:

The maximum predicted percentage of bio-oil obtained was 62.4% for the temperature conditions of 498° C. at a feed rate of 1 kg/h and a particle size of 1.7 mm. It is interesting to note that the tests have yielded 61.54% of bio-oil. This value is similar to that predicted theoretically (62.4%);

According to a typical process making use of the embodiment of thermochemical treatment system as described above in view of FIG. 1, the temperature of the separation chamber 30 must remain ≥200° C., which prevents the condensation of pyrolytic vapor at this level. In addition, the use of the vacuum pump 54 (suction of 7-10 L/min of pyrolytic vapor) helps to quickly evacuate the vapor from the sensitive condensation area;

The pressure in the reactor 11 must be maintained at about 500 mm Hg;

The minimum value predicted for the production of biochar is 26% for values of 500° C., feed rate of 1.0 kg/h and particle size of 1.8 mm;

In the ranges tested, the percentage of gas is not significantly influenced by the different reaction parameters.

So, according to the analysis of the results, optimum operating conditions which have produced a maximum amount of pyrolytic oil are:

Particle size of 1.7 mm;
Temperature of 498° C. in the thermochemical reaction chamber 18;
Pressure in the reactor 11 of 500 mm Hg;
Feed rate of the biomass of 1 kg/h.

Example 2

Physicochemical Properties of Bio-Oil

The physicochemical properties of the bio-oil obtained under the optimum operating conditions, such as dynamic viscosity, density, pH, ash content, and particles insoluble in methanol, the calorific value and moisture content were determined according to modified ASTM methods. The difference between the calorific values of bio-oils reflects the complex influence of operating parameters on the quality of products produced and their degree of heterogeneity. It should be noted that once stored cold to prevent their polymerization, the bio-oil separate into different phases during cooling, making it difficult to take small samples (mg) after storage for analysis. The results of 15 tests provided by the Box-Behnken plan are summarized in Table 12. During these tests, the condensed bio-oil collected in the first reservoir 59 and the second reservoir 76 were mixed for analysis.

TABLE 12

| | N° | | | | | | | |
| --- | --- | --- | --- | --- | --- | --- | --- | --- |
| | 1 | 2 | 3 | 4 | 5 | 6 | 7 | 8 |
| | 525° C. | 475° C. | 475° C. | 525° C. | 475° C. | 525° C. | 475° C. | 525° C. |
| | 0.5 kg/h | 0.5 kg/h | 1.5 kg/h | 1.5 kg/h | 1 kg/h | 1 kg/h | 1 kg/h | 1 kg/h |
| Parameter | 2 mm | 2 mm | 2 mm | 2 mm | 1 mm | 1 mm | 3 mm | 3 mm |
| Dynamic viscosity @ 40° C. (cP) | 39.2 | 46.3 | 42.61 | 44.04 | 62.66 | 51.61 | n.d. | 41.32 |

TABLE 12-continued

| | | | | | | | | |
|---|---|---|---|---|---|---|---|---|
| Density @ 40° C., g/l | 0.8946 | 0.8614 | 0.9684 | 0.9616 | 1.0045 | 1.0407 | n.d. | 0.9022 |
| Density @ 25° C., g/l | 0.9152 | 0.8814 | 0.9928 | 0.9799 | 1.0226 | 1.0435 | n.d. | 0.9185 |
| pH | 5.51 | 5.04 | 5.19 | 5.55 | 5.53 | 4.88 | 5.12 | 5.19 |
| Ash, Mass % | 0.35 | 0.16 | 0.20 | 0.16 | 0.21 | 0.17 | 0.10 | 0.16 |
| Insoluble in methanol Mass % | 2.52 | 1.24 | 0.98 | 0.75 | 1.40 | 0.74 | 1.17 | 1.50 |
| HHV*, MJ/kg | 34.65 | 26.40 | 16.68 | 16.01 | 13.07 | n.d. | n.d. | n.d. |
| Water content (Karl Fisher), Mass % | 26.08 | 43.41 | 51.56 | 38.88 | n.d. | n.d. | n.d. | n.d. |

| | N° | | | | | | |
|---|---|---|---|---|---|---|---|
| Parameter | 9<br>500° C.<br>0.5 kg/h<br>1 mm | 10<br>500° C.<br>1.5 kg/h<br>1 mm | 11<br>500° C.<br>0.5 kg/h<br>3 mm | 12<br>500° C.<br>1.5 kg/h<br>3 mm | 13<br>500° C.<br>1 kg/h<br>2 mm | 14<br>500° C.<br>1 kg/h<br>2 mm | 15<br>500° C.<br>1 kg/h;<br>2 mm |
| Dynamic viscosity @ 40° C. (cP) | 31.82 | 46.34 | 66.29 | 106.86 | 70.97 | 66.65 | 72.04 |
| Density @ 40° C., g/l | 0.9630 | 1.0091 | 0.9801 | 1.0115 | 1.0001 | 1.0206 | 1.0236 |
| Density @ 25° C., g/l | 0.9661 | 1.0185 | 0.9813 | 1.0164 | 1.0074 | 1.0222 | 1.0540 |
| pH | 5.28 | 5.33 | 4.54 | 4.78 | 4.88 | 4.85 | 4.94 |
| Ash, Mass % | 0.14 | 0.41 | 0.14 | 0.28 | 0.28 | 0.29 | 0.36 |
| Insoluble in methanol Mass % | 0.90 | 0.65 | 1.63 | 2.14 | 1.14 | 1.32 | 1.03 |
| HHV*, MJ/kg | n.d. | n.d. | n.d | n.d. | n.d. | n.d. | n.d. |
| Water content (Karl Fisher), Mass % | n.d. | 69.63 | 60.46 | 41.83 | n.d. | 60.68 | 47.38 |

Standard deviation - 10-12% for the ashes;
n.d.—not determined
*HHV—Higher heating value The physicochemical properties of the bio-oil obtained under the optimum operating conditions were determined. To do this, two tests of pyrolysis with the same operating conditions were performed and the bio-oils obtained were analyzed to obtain the values of physicochemical properties shown in Table 13.

TABLE 13

| Properties | Bio-oil n° 1 | Bio-oil n° 2 |
|---|---|---|
| Operating parameters | 498° C.;<br>1.0 kg/h; 1.7 mm | 498° C.;<br>1.0 kg/h;<br>1.7 mm |
| Dynamic viscosity @ 40° C. (cP) | 80.76 | 88.17 |
| kinematic viscosity @ 40° C. (Pa · s) | 72.71 | 96.15 |
| Dynamic viscosity @ 15° C. (cP) | 116.17 | 136.13 |
| Density @ 15° C., kg/l | 0.9811 | 1.0218 |
| pH | 5.46 | 5.16 |
| Ash content, mass % | 0.13 | 0.16 |
| Fine particles of biochar (insoluble in methanol), Mass % | 1.0 | 1.2 |
| HHV (MJ/kg) | 22.27 | 24.46 |
| Water Content (Karl Fisher), Mass % | 22.5 | 37.0 |

Standard deviation: 1-5% for the ashes

The dynamic viscosity of bio-oil at 40° C. is 80 to 90 cP, and it is comparable to that of bio-oils obtained from different origins. Most properties such as density, pH, ash content and methanol insoluble particles are almost identical to those of bio-oils obtained in the tests programmed according to the plan Box-Behnken. The calorific value of bio-oil has been 20% higher than the average found in the literature for equivalent bio-oil. The bio-oil obtained has all the features for allowing it to be used as a substitute fuel in heating systems that use heavy oils such as bunker or number 6 fuel oil. The miscibility of the bio-oil produced has been tested successfully in different proportions (5, 10, and 20% by volume) and under ambient conditions with petroleum products such as kerosene, diesel and biodiesel.

Example 3

Physicochemical Properties of Biochar

Regarding the physicochemical properties of biochar, the results of the fifteen tests provided by the Box-Behnken plan are presented in Table 14.

TABLE 14

| Parameter | 1<br>525° C.<br>0.5_kg/h<br>2_mm | 2<br>475° C.<br>0.5_kg/h<br>2_mm | 3<br>475° C.<br>1.5_kg/h<br>2_mm | 4<br>525° C.<br>1.5_kg/h<br>2_mm | 5<br>475° C.<br>1_kg/h<br>1_mm | 6<br>525° C.<br>1_kg/h<br>1_mm | 7<br>475° C.<br>1_kg/h<br>3_mm | 8<br>525° C.<br>1_kg/h<br>3_mm |
|---|---|---|---|---|---|---|---|---|
| pH | 5 mass % of biochar in water ≈ pH 10.68 | | | | | | | |
| Ash mass % | 26.5 | 32.2 | 33.0 | 31.9 | 32.7 | 33.7 | 26.8 | 31.4 |
| HHV, MJ/kg | 17.5 | 19.0 | 20.1 | 19.5 | 17.8 | n.d. | n.d. | n.d. |
| HHV*, MJ/kg | 11.9 | 14.7 | 13.5 | 11.7 | 12.9 | n.d. | n.d. | n.d. |
| Moisture content mass % | 2.3 | 0.3 | 0.3 | 1.3 | 1.1 | 0.9 | 2.3 | 0.5 |
| P-Total content mg/kg | 35 298 | 28 746 | 29291 | 29 987 | 32 007 | n.d. | n.d. | n.d. |
| Carbon, % | 28.90 | 33.75 | 31.50 | 27.95 | 29.90 | n.d. | n.d. | n.d. |
| Hydrogen % | 3.90 | 5.25 | 5.05 | 4.95 | 5.20 | n.d. | n.d. | n.d. |
| Nitrogen, % | 3.15 | 3.85 | 3.45 | 2.92 | 3.08 | n.d. | n.d. | n.d. |
| Sulfur, % | 0.51 | 0.33 | 0.33 | 0.36 | 0.33 | | | |

| Parameter | 9<br>500° C.<br>0.5_kg/h<br>1_mm | 10<br>500° C.<br>1.5_kg/h<br>1_mm | 11<br>500° C.<br>0.5_kg/h<br>3_mm | 12<br>500° C.<br>1.5_kg/h<br>3_mm | 13<br>500° C.<br>1_kg/h<br>2_mm | 14<br>500° C.<br>1_kg/h<br>2_mm | 15<br>500° C.<br>1_kg/h<br>2_mm | Raw Manure |
|---|---|---|---|---|---|---|---|---|
| pH | 5 mass % of biochar in water ≈ pH 10.68 | | | | | | | n.d. |
| Ash mass % | 33.3 | 31.9 | 33.0 | 35.0 | 33.1 | 33.9 | 34.8 | 14.8 |
| HHV, MJ/kg | n.d. | n.d. | n.d. | n.d. | n.d. | n.d. | n.d. | 18.6 |
| HHV*, MJ/kg | n.d. | n.d. | n.d. | n.d. | n.d. | n.d. | n.d. | 15.2 |
| Moisture content mass % | 0.6 | 0.5 | 0.5 | 0.3 | 0.8 | 1.3 | 0.4 | 2.4 |
| P-Total content mg/kg | n.d | n.d | n.d. | n.d. | n.d. | n.d. | n.d. | 15 683 |
| Carbon, % | n.d. | n.d. | n.d. | n.d. | n.d. | n.d. | n.d. | 36.90 |
| Hydrogen % | n.d. | n.d. | n.d. | n.d. | n.d. | n.d. | n.d. | 5.60 |
| Nitrogen, % | n.d. | n.d. | n.d. | n.d. | n.d. | n.d. | n.d. | 3.24 |
| Sulfur, % | | | | | | | | 0.07 |

Standard deviation: 2-7% for the ashes and moisture content
*Estimated value according to Graboski and Bain Formula (1981)

The physicochemical properties of biochar obtained in the optimum operating conditions were also determined. To do this, two pyrolysis tests were performed with the same optimum operating conditions, both biochar obtained (biochar No. 1 and biochar 2) were characterized to provide test results presented in Table 15.

TABLE 15

| Properties | Biochar n° 1 | Biochar n° 2 | Raw Manure |
|---|---|---|---|
| Operating parameters | 498° C.;<br>1.0 kg/h;<br>1.7 mm | 498° C.;<br>1.0 kg/h;<br>1.7 mm | 498° C.; 1.0 kg/h;<br>1.7 mm |
| pH | 5% (mass of biochar/volume of water) ≈ pH 10.68 | | |
| Ash Content, mass % | 35.1 | 33.6 | 15.3 |
| Heat of combustion, MJ/kg | 16.2 | 18.2 | 18.6 |
| HHV*, MJ/kg | 18.8 | 16.02 | 15.2 |
| Moisture content mass % | 0.20 | 0.17 | 1.97 |
| Carbon mass % | 48.14 | 40.82 | 36.90 |
| Hydrogen mass % | 3.00 | 2.90 | 5.60 |
| Nitrogen mass % | 3.60 | 3.44 | 3.24 |
| Sulfur mass % | 0.52 | 1.19 | 0.07 |

*Estimated value according to Graboski and Bain Formula (1981)

Under optimal conditions, the calorific values of biochar are lower than those of the raw material and the theoretical values (PCS) determined by the formula Graboski and Bain (1981). This is probably due to the fact that biochar contains twice the amount of ash as raw material and a certain amount of condensed bio-oil and that the formula does not account for all components of the products analyzed. Total phosphorus, carbon, hydrogen, nitrogen and sulfur content in the biomass are concentrated in the biochar where their levels have doubled.

Example 4

Chromatographic Analysis of Bio-Oil

Figure 13:
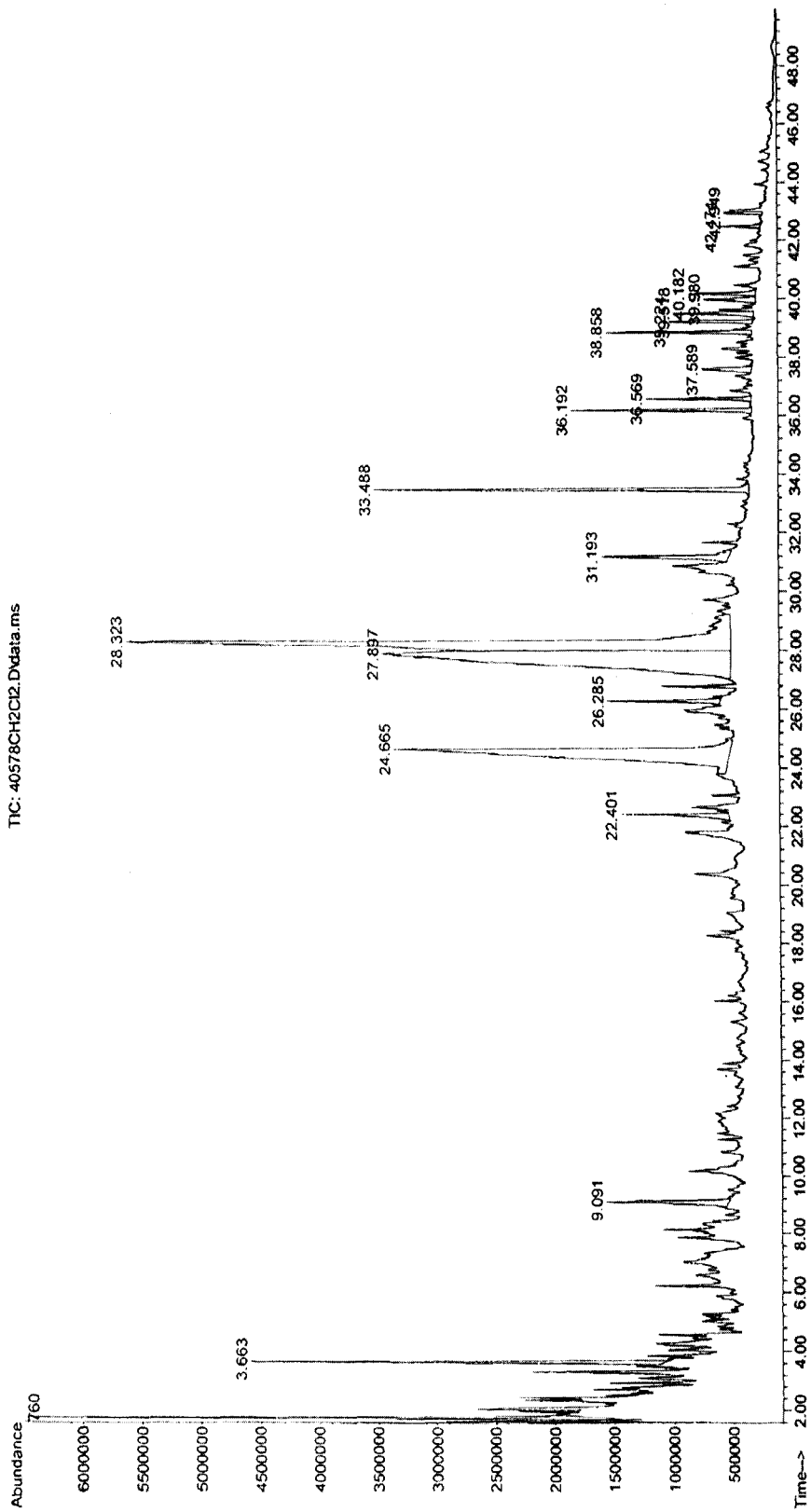
FIG. 13 illustrates is a chromatogram of the bio-oil obtained under the optimum conditions for pyrolysis of biomass.

Chromatographic analysis on DB-5HT column with dichloromethane as solvent, performed on samples of bio-oil obtained under optimum conditions is shown in the chromatogram of FIG. 13 to Table 16. A total of 10 major organic components have been identified.

TABLE 16

| N° | Compounds | Approximate quantity (%) |
|---|---|---|
| 1 | Decane | 4.2 |
| 2 | 4-ethyl-2-methoxy-phenol | 0.8 |
| 3 | Pentadecanoic acid | 1.4 |
| 4 | N-hexadecanoic acid | 16.8 |
| 5 | Oleic acid | 27.2 |
| 6 | Octadecanoic acid | 26.3 |
| 7 | Octadecanamid | 2.3 |
| 8 | Diisooctyl ester of 1,2-benzenedicarboxylic acid | 4.0 |
| 9 | 5-β-cholest-3-ene | 1.9 |
| 10 | Cholest-2-ene | 1.1 |

Table 16 shows that the bio-oil consists mainly of fatty acids. Other organic compounds such as cholesterol and various aromatic hydrocarbons are present in the bio-oil in small quantities.

Example 5

Analysis of Pyrolysis Gas

Qualitative analysis of pyrolysis gas obtained under optimal conditions was also performed and the results are presented in Table 17. Compounds such as carbon dioxide, carbon monoxide, methane, ammonia, nitric oxide and sulfur dioxide were determined using a Brüel & Kjaer analyzer, model 1301. This is an infrared spectrometer Fourier transform with a photoacoustic infrared detector. The other compounds shown in Table 16 were detected by chromatography and identified by mass spectroscopy. A total of 18 different organic compounds have been identified.

TABLE 17

| N° | Compound |
|---|---|
| 1 | Carbon dioxide |
| 2 | Carbon monoxide |
| 3 | Methane |
| 4 | Ammonia |
| 5 | Nitric oxide |
| 6 | Sulfur dioxide |
| 7 | Propene |
| 8 | Trichloromethane |
| 9 | Acetaldehyde |
| 10 | Methanethiol |
| 11 | Acetone |
| 12 | Toluene |
| 13 | Propyl benzene |
| 14 | 1-Ethyl-2-methyl benzene |
| 15 | Decane |
| 16 | 1,2,4-Trimethyl benzene |
| 17 | n-Butylcyclohexane |
| 18 | Undecane |

Figure 14:
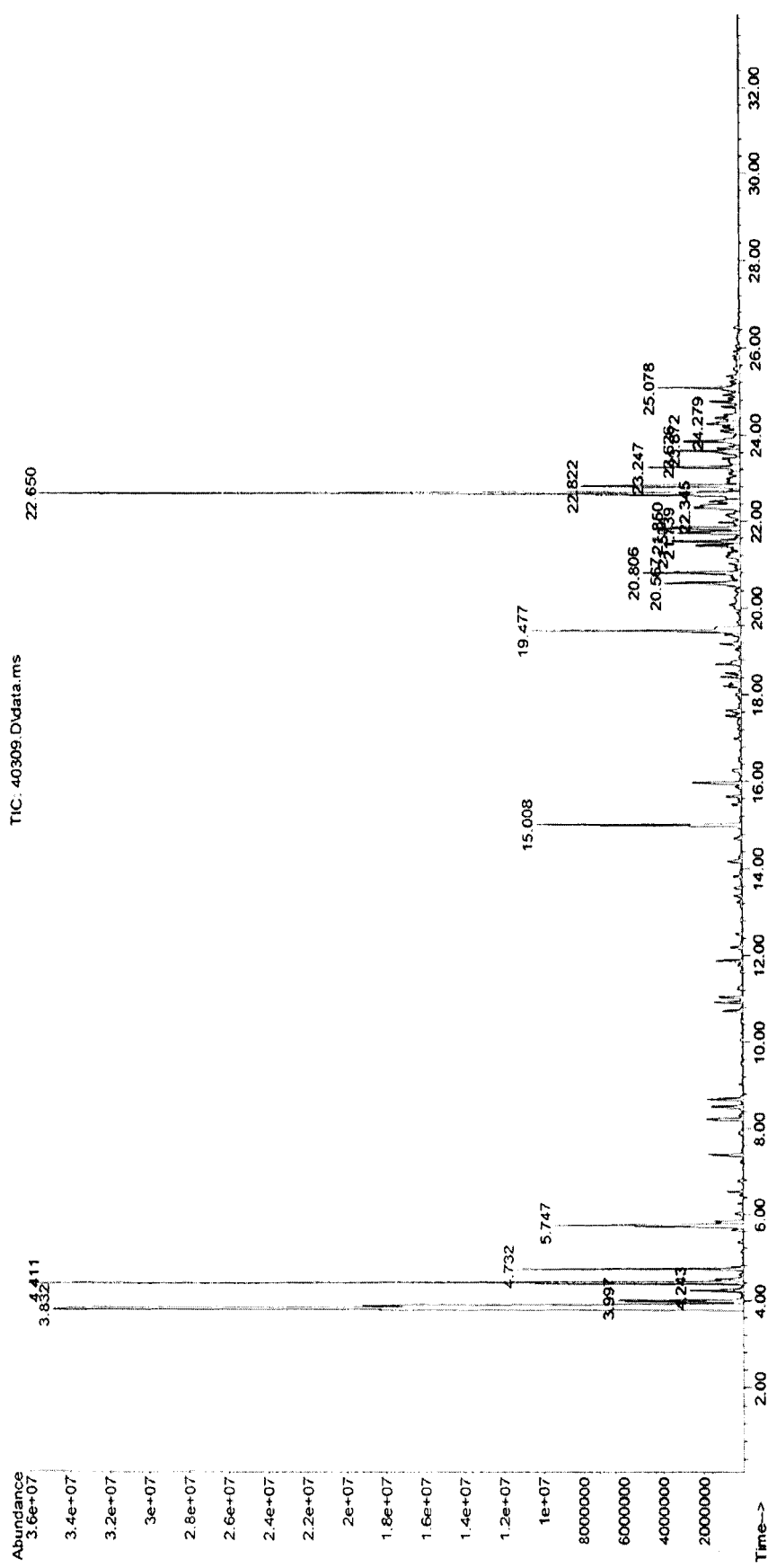
FIG. 14 illustrates a chromatogram of pyrolysis gas obtained under optimum conditions of pyrolysis of biomass, to identify organic compounds.

In reference to the chromatogram shown in FIG. 14, the number of observed peaks shows that the pyrolysis gases contain a lot of relatively heavy compounds that have not had time to condense in the bio-oil phase. Gases such as pyrolytic products with interesting calorific value can be used as a supplementary fuel to dry the biomass, heat the reactor or heat buildings.

The mineral composition of ash from biochar produced under optimal conditions is presented in Table 18, where the values obtained are compared with those given in the standards governing the use of minerals in agricultural soils.

TABLE 18

| Metals (mg/kg; dry basis) | Category 1 Limiting content | Category 2 Limiting content | N° 1 | N° 2 | Raw manure |
|---|---|---|---|---|---|
| Arsenic | 13 | 41 | 0.5 | 0.5 | 0.5 |
| Barium | 500 | n.d | 55 | 41 | 19 |
| Boron | 400 | n.d | 86 | 83 | 39 |
| Cadmium | 3.0 | 10 | 0.5 | 0.5 | 0.5 |
| Chrome | 210.0 | 1060 | 22 | 53 | 3 |
| Cobalt | 34.0 | 150 | 4 | 4 | 2 |
| Copper | 400.0 | 1 000 | 1 800 | 1 800 | 710 |
| Mercury | 0.8 | 4 | 0.01 | 0.01 | 0.01 |
| Molybdenum | 5.0 | 20 | 9 | 10 | 3 |
| Nickel | 62.0 | 180 | 42 | 54 | 14 |
| Lead | 150.0 | 300 | 15 | 7 | 5 |
| Selenium | 2.0 | 14 | 2.4 | 2.3 | 1.5 |
| Zinc | 700.0 | 1 850 | 2 600 | 2 500 | 1 200 |
| Conditions n° 1- 498°; 1.0 kg/h; 1.7 mm | | | | | |
| Conditions n° 2- 498°; 1.0 kg/h; 1.7 mm | | | | | |
| Category-1 | To be categorized as C1, all parameters must meet C1 requirements. To be categorized as C2, all parameters must meet C2 requirements and at least one parameter must exceed C1 requirements. If we do not require testing for chemical contaminant according to table 6.1*, the content is deemed to be below C1 limit. The classification is based on an average value of the analysis conducted during the last 12 months. | | | | |
| Category-2 | The load limit of C2 residues is 22 t (b. s.)/ha/5 years | | | | |

The biochar products meet standards for Category 1 and 2 except for the copper and zinc. These metals are usually added to food for pigs to improve digestion and prevent bacterial infections. However, research has been undertaken to replace copper and zinc by pre- and probiotics products.

The biochar obtained under optimal conditions have been tested for leaching, the results are presented in Table 19.

TABLE 19

| Metals | Allowable Limit (mg/L) | Biochar n° 1 | Biochar n° 2 |
|---|---|---|---|
| Aluminium | 0.75 | <0.1 | <0.1 |
| Antimony | 0.088 | 0.02 | 0.02 |
| Arsenic | 0.34 | <0.01 | <0.01 |
| Barium | 5.3 | <0.7 | <0.7 |
| Boron | 100 | 1 | 0.9 |
| Cadmium | 0.0021 | <0.01 | <0.01 |
| Chrome | 0.016 | 0.02 | 0.02 |
| Cobalt | 0.5 | <0.01 | <0.01 |
| Copper | 0.0073 | 0.12 | 0.01 |
| iron | 17 | <0.5 | <0.5 |
| lead | 0.001 | <0.1 | <0.1 |
| Manganese | 0.003 | 4.61 | 5.17 |
| Mercury | 0.00013 | <0.0004 | <0.0004 |
| Molybdenum | 2 | <0.02 | <0.02 |
| Nickel | 0.26 | <0.01 | <0.01 |
| Selenium | 1 | 0.01 | 0.01 |
| Silver | 0.0062 | 0.02 | 0.02 |
| Sodium | 200 | | |
| Zinc | 1 | 0.9 | 1.4 |

Conditions n° 1-498°; 1.0 kg/h; 1.7 mm
Conditions n° 2-498°; 1.0 kg/h; 1.7 mm

Table 19 shows that the leachate contains metals in excess of the limits prescribed in the standard. To make the biochar useful for agricultural soils, the concentrations of metals in the leachate must be below the allowable limits. To work around this problem, an approach of pre-mix the solid residues of pig manure with those of poultry (e.g. chicken) manure or other animals could be considered to mitigate the possible scope of those factors that affect the quality of biochar. Otherwise, the biochar as produced during the tests could be used for combustion to produce heat. The proposed method substantially reduces the risks associated with pathogens and reduces significantly the odors emitted by this residue in storage or during spreading on agricultural soils.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for thermochemical treatment of matter containing organic compounds, comprising:
    a reactor comprising:
        a feedstock reservoir having a reservoir entry, and a reservoir exit, for said matter,
        a thermochemical reaction chamber, having
            a thermochemical reaction chamber entrance disposed under and coupled to said reservoir exit,
            a first heating means for thermal treatment of said matter to produce a solid and a vapor, and
            a thermochemical reaction chamber exit,
        a feeder having
            at least one substantially vertical auger operatively coupled to said feedstock reservoir and said thermochemical reaction chamber exit to drive said matter downwardly from said feedstock reservoir exit through said thermochemical reaction chamber,
        a chamber for separation of said solid from said vapor while substantially maintaining said vapor in a gaseous state, having
            a separation chamber entrance coupled to said thermochemical reaction chamber exit,
            and
            a separation chamber exit for exit of said vapor;
    a controller, operatively coupled to said first heating means for controlling temperature of said thermochemical reaction chamber, and
    a pump operatively coupled to the separation chamber exit for maintaining a light vacuum within said reactor and for helping exit of said vapor.

2. The system of claim 1, wherein said first heating means is at least one electrical block.

3. The system of claim 1, wherein said separation chamber comprises a second heating means for heating said separation chamber to maintain said vapor in a gaseous state, said controller being operatively coupled to said separation chamber for controlling temperature thereof, and wherein said separation chamber separates said solid from said vapor by gravity.

4. The system of claim 3, wherein said thermochemical reaction chamber further comprises a first temperature sensor for measuring temperature in said thermochemical reaction chamber, and said separation chamber further comprises a second temperature sensor for measuring temperature in said separation chamber, said controller being electrically coupled to said first and second temperature sensors.

5. The system of claim 1, wherein said separation chamber comprises a cyclonic separator receiving said solid and said vapor at said separation chamber entrance and coupled to a reservoir for collecting said separated solid.

6. The system of claim 1, wherein said thermochemical reaction chamber further comprises a first temperature sensor for measuring temperature in said thermochemical reaction chamber, said controller being electrically coupled to said first temperature sensor.

7. The system of claim 1, further comprising a vapor processing unit coupled to said separation chamber exit.

8. The system of claim 7, wherein said vapor processing unit comprises at least one condenser, at least one vapor collector and at least one condensed vapor fraction collector.

9. The system of claim 7, wherein said vapor processing unit is coupled to said separation chamber exit with a heated conduit operatively coupled to a third heating means, to prevent condensation of said vapor.

10. A process for the thermochemical treatment of a matter containing organic compounds comprising step a):
    a) performing a thermal treatment of said matter in a system according to claim 1, at a residence time of said matter in said thermochemical reaction chamber of about 0.5 seconds to about 10 seconds, and a feed rate of said matter in said thermochemical reaction chamber of about 0.5 kg/h to about 1.5 kg/h to obtain said solid separated from said vapor.

11. The process of claim 10, wherein said matter contains less than about 10% humidity.

12. The process of claim 10, wherein said matter has a granulometry of from about 1 mm to about 3 mm.

13. The process of claim 10, wherein said thermal treatment is a torrefaction treatment, a pyrolysis treatment, or a gasification treatment.

14. The process of claim 13, wherein said torrefaction treatment is performed at about 200° C. to about 320° C.

15. The process of claim 13, wherein said pyrolysis is performed at about 400° C. to about 600° C.

16. The process of claim 13, wherein said gasification treatment is performed at about 700° C. to about 1200° C.

17. The process of claim 10, further comprising step b):
b) condensing said separated vapor to produce a condensed vapor fraction.

18. The process of claim 17, further comprising step c), after step b):
c) collecting said solid, said condensed vapor fraction and/or a non-condensed fraction of said separated vapor.

19. The process of claim 10, further comprising step a'), before step a):
a') purging said system by injection of an inert gas.

20. The process of claim 10, wherein said pump is operated to maintain within said reactor a pressure between about 666 hPa and 800 hPa.

21. The process of claim 10, wherein the temperature in said separation chamber is controlled at an operating temperature from about 200° C. to about 250° C.

* * * * *